United States Patent [19]

Kagawa

[11] Patent Number: 5,257,923
[45] Date of Patent: Nov. 2, 1993

[54] POROUS FILM MANUFACTURING APPARATUS

[75] Inventor: Seiji Kagawa, 8-15-11-301, Tajima, Urawa-shi, Saitama-ken, Japan

[73] Assignees: Norito Sudo; Seiji Kagawa, both of Saitama, Japan

[21] Appl. No.: 703,827

[22] Filed: May 21, 1991

[30] Foreign Application Priority Data

Feb. 28, 1991 [JP] Japan .................................. 3-59454

[51] Int. Cl.⁵ .............................................. B26F 1/10
[52] U.S. Cl. ...................... 425/290; 83/663; 425/174.4; 425/367
[58] Field of Search ....... 425/290, 363, 367, DIG. 26, 425/DIG. 37, DIG. 235, 174.4; 264/154; 83/663, 509

[56] References Cited

U.S. PATENT DOCUMENTS

| | | | |
|---|---|---|---|
| 3,141,746 | 7/1964 | De Lai | 425/DIG. 26 |
| 3,359,597 | 12/1967 | Bainton | 425/367 X |
| 3,529,045 | 9/1970 | Rosenstein | 425/367 X |
| 4,057,377 | 11/1977 | Sakurazawa | 425/367 X |
| 4,351,784 | 9/1982 | Thomas et al. | 264/22 |
| 4,859,519 | 8/1989 | Cabe, Jr. et al. | 425/290 X |
| 5,057,167 | 10/1991 | Gersbeck | 425/367 X |

FOREIGN PATENT DOCUMENTS

| | | |
|---|---|---|
| 0119537 | 9/1984 | European Pat. Off. |
| 0256717 | 2/1988 | European Pat. Off. |
| 0259003 | 3/1988 | European Pat. Off. |
| 2830402 | 1/1980 | Fed. Rep. of Germany |
| 2073807 | 10/1971 | France |
| 2157779 | 10/1985 | United Kingdom |

OTHER PUBLICATIONS

World Patents Index Latest, Week 9207, Derwent Publications Ltd., London, GB; AN 92-054124 & JP-A-4 002 499 (Saitama Leather KK) 7 Jan. 1992.

Patent Abstracts of Japan, vol. 015, No. 145, Apr. 12, 1991 & JP-A-3 024 172 (Sany9 Kokusaku Pulp Co. Ltd.) Feb. 1, 1991.

Abstract of Japanese Unexamined Application No. 63-96348, Publication No. 1-266150, Oct. 24, 1989 Showa Electric Wire & Cable Co. ltd.

*Primary Examiner*—Richard L. Chiesa
*Attorney, Agent, or Firm*—Kenyon & Kenyon

[57] ABSTRACT

A porous film manufacturing apparatus is disclosed, which can continuously and uniformly form a large number of uniform through pores or blind pores, each having a size arbitrarily selected in the range of sub-$\mu$m to several tens $\mu$m, in an elongated film made of various types of materials, such as polymeric materials and metals, at a high density (e.g., 5,000 to 200,000 per cm$^2$), without almost any deterioration in essential characteristics of the film materials. The manufacturing apparatus includes a feeder for feeding an elongated film, a perforating unit including a first rotatable roll having a surface on which a large number of particles, each having acute corner portions and a Mohs hardness value of not less than 5, are deposited, and a second roll which is rotatable in a direction reverse to a rotating direction of the first roll, the first and second rolls being arranged to oppose each other and to cause the elongated film to pass therebetween, one of the rolls being stationary, and the other roll being movable in a direction to oppose the one roll, and a pressure controller, arranged near two end portions of the movable roll of the unit, for controlling a pressure applied from each of the rolls to the film.

48 Claims, 13 Drawing Sheets

POROUS FILM MANUFACTURING APPARATUS

BACKGROUND OF THE INVENTION

1. Field of the Invention

The present invention relates to a porous film manufacturing apparatus and, more particularly, to an apparatus for manufacturing a porous film having vapor permeability or both vapor permeability and air permeability and suitable for a material such as a sanitary material for a disposable paper diaper as a typical example, a medical material, or a clothing material.

2. Description of the Related Art

A method disclosed in Published Unexamined Japanese Patent Application No. 1-266150 is known as a conventional method of manufacturing a porous film. In this method, after a large amount of fine inorganic powder is added to a thermoplastic resin, e.g., polyethylene (normally, the amount of powder is 50 vol% or more of the resin), the compound is subsequently formed into a film, and the film is uniaxially or biaxially stretched at a high magnification to form open cells in the interface between the resin and the inorganic powder, thus forming fine pores communicating with each other in the form of a maze.

In the conventional manufacturing method described above, however, the following problems are posed.

(1) Since a large amount of inorganic powder is added, the essential properties (e.g., strength, softness and transparency) of a resin constituting a film are considerably deteriorated, and a plastic-like film cannot be substantially obtained.

(2) Since a large amount of inorganic powder is added, and the resultant film is uniaxially or biaxially stretched at a high magnification, this method cannot be applied to a film having elasticity, such as an elastomer film.

(3) Since fine pores on the submicron order are formed in the resultant film so as to communicate with each other in the form of a maze, the film has almost no air permeability although it has vapor permeability. For this reason, practical applications of the film are undesirably limited.

As other porous film manufacturing methods, mechanical perforation methods such as a needle punch method and a heat fusion perforation method are known. In the needle punch method, a thermoplastic resin film is perforated by pressing heated needles against the film. In the heat fusion perforation method, a thermoplastic resin film is perforated by fusing the film by using a heated embossed roll.

In the above-described mechanical perforation methods, however, the size of each pore is as large as 100 $\mu$m, and it is difficult to form smaller pores. In addition, the above-mentioned pores cannot be formed at a high density (e.g., 5,000 or more per 1 cm$^2$).

SUMMARY OF THE INVENTION

It is an object of the present invention to provide a porous film manufacturing apparatus which can uniformly form a large number of uniform through pores or blind pores, each having a size arbitrarily selected in the range of sub-$\mu$m to several tens $\mu$m, in an elongated film made of various types of materials, such as polymeric materials and metals, at a high density (e.g., 5,000 to 200,000 per cm$^2$), with almost no deterioration in essential properties of the film materials.

It is another object of the present invention to provide a porous film manufacturing apparatus which can uniformly and continuously form a large number of uniform through pores or blind pores, each having a small size described above, in an elongated film made of various types of materials at a high density without shearing the film.

It is still another object of the present invention to provide a porous film manufacturing apparatus which can uniformly form a large number of uniform through pores in an elongated film made of a polymeric material without making scratches on the film.

According to the present invention, there is provided a porous film manufacturing apparatus comprising:

feed means for feeding an elongated film;

a perforating unit including a first rotatable roll having a surface on which a large number of particles, each having acute corner portions and a Mohs hardness value of not less than 5, are deposited, and a second roll which is rotatable in a direction reverse to a rotating direction of the first roll, the first and second rolls being arranged to oppose each other and to cause the elongated film to pass therebetween, one of the rolls being stationary and the other roll being movable in a direction to oppose the one roll; and pressure control means, arranged near two end portions of the movable roll of the unit, for controlling a pressure applied from each of the rolls to the film.

Examples of the above film are: various types of polymer films such as a polyolefin film (e.g., polyethylene or polypropylene), a polyester film, and an elastomer film; a composite film obtained by mixing a polymeric material with an inorganic powder such as a silica powder, a carbon powder, or an alumina powder; a laminated film obtained by laminating two or three polymer films made of different materials, a laminated film obtained by laminating a woven or nonwoven fabric on a polymer film, or a laminated film obtained by laminating an aluminum or copper film on a polymer film; and a metal film such as an aluminum or copper film. Note that materials for the metal layer and the metal film are selected from materials having hardness value smaller than the hardness value of each particle on the first roll. In addition, as the film, a film having a thickness of 1 $\mu$m to 1 mm can be used.

The feed means is, for example, a roller on which rolls of the films are mounted. Alternatively, the feed means can be an apparatus for forming film by inflation method or casting method if the elongated film is made of polymeric material. If this is the case, porous films can be manufactured directly from the polymeric material.

The first roll has a structure in which a large number of particles, each having acute corner portions and a Mohs hardness value of 5 or more, are electrodeposited on the surface of a metal roll body or are bonded thereto with an organic or inorganic binder. As the particle having a Mohs hardness value of 5 or more, for example, a carbide alloy particle (e.g., a tungsten carbide particle, a silicon carbide particle, or a boron carbide particle), a sapphire particle, a cubic boron nitride (CBN) particle or natural or synthetic diamond particle may be used. Especially, a synthetic diamond particle having a large hardness value or strength is preferable. As the particles, particles having particle diameters of 10 to 100 $\mu$m and a particle diameter variation of 5% or lower are preferably used. Since through pores or blind pores are to be formed in a film at a high density, the large number of particles are preferably deposited on the surface of the roll body at an area ratio of 70% or more.

As the second roll, for example, one of the following rolls may be used: a roll having a hard surface such as an iron-based alloy roll and an iron roll whose surface is Ni-plated or Cr-plated; and a roll having a soft surface such as a roll obtained by coating a polymeric resin layer on the surface of a metal roll body, a brass roll, an aluminum roll, or a copper roll. Various types of polymer resins can be used. Especially, an urethane resin, silicone rubber, or the like having a good cushioning effect on an elongated film is preferably used. The second roll can be made of a hard metal, such as stainless steel, and thus have a hard surface, thereby a large number of through pores can be formed in an elongated film fed from the feed means. However, some blind pores may be included depending on a film material. The second roll can be formed by coating a polymeric resin layer on a roll body, and thus have a soft surface, thereby a large number of blind pores can be formed in a film fed from the feed means when it is pressed between the first and second rolls, because a cushioning effect acts on the film.

The perforating unit is preferably constituted by the first and second rolls, shafts respectively extending through the rolls, and boxes incorporating bearings serving to axially support both end portions of the shafts.

The first and second rolls constituting the perforating unit may be horizontally or vertically arranged. In addition, either the first roll or the second roll may be set to be movable. However, in order to facilitate mounting of the pressure control means, it is preferable that the fist roll be stationary, and the second roll be movable. Especially, it is preferable that the first roll be stationary, and the second roll be arranged above the first roll to be movable. If the first and second rolls are arranged in this manner, the pressure control means are arranged on the upper surface near two ends of the upper second roll.

The pressure control means preferably include springs for biasing the boxes, arranged near the two end portions of the movable roll of the unit, toward the stationary roll.

Two or three or more units, each identical to the perforating unit in which the pressure control means is arranged, may be arranged in the conveying direction of the elongated film. If, for example, two units are to be arranged, a large number of particles, each having a Mohs hardness value of 5 or more, which are deposited on the first roll of the unit of the first row may have a particle size different from that of particles deposited on the first roll of the unit of the second row. In addition, if two units are to be arranged, after an elongated film is caused to pass between and perforated by the first and second rolls of the unit of the first row, the elongated film may be caused to pass between the first and second rolls of the unit of the second row while the elongated film surface opposite to the perforated surface is in contact with the first roll (on which a large number of particles, each having a Mohs hardness value of 5 or more, are deposited), thereby perforating the upper and lower surfaces of the film.

A destaticizing means may be arranged at the outlet of the perforating unit. This destaticizing means is constituted by a vessel in which, for example, pure water is stored, and an ultrasonic wave generating member for applying ultrasonic waves to the pure water.

According to the porous film manufacturing apparatus having such an arrangement, the apparatus comprises: a feed means for feeding an elongated film; a perforating unit including a first rotatable roll having a surface on which a large number of particles, each having acute corner portions and a Mohs hardness value of not less than 5, are deposited, and a second roll which is rotatable in a direction reverse to a rotating direction of the first roll, the first and second rolls being arranged to oppose each other and to cause the elongated film to pass therebetween, one of the rolls being stationary, and the other roll being movable in a direction to oppose the one roll; and a pressure control means, arranged near two end portions of the movable roll of the unit, for controlling a pressure applied from each of the rollers to the film. With this arrangement, the apparatus can continuously and uniformly form a large number of uniform through pores or blind pores, each having a size arbitrarily selected in the range of sub-$\mu$m to several tens $\mu$m, in an elongated film made of various types of materials, such as polymeric materials and metals, at a high density (e.g., 5,000 to 200,000 per cm$^2$), with almost no deterioration in essential characteristics of the film materials.

The second roll made of a metal or having a surface covered with a polymeric resin layer can be processed with a precision of several $\mu$m to sub-$\mu$m by the current mechanical process techniques. However, the first roll constituting the unit and has a surface on which a large number of particles (e.g., synthetic diamond particles), each having a Mohs hardness value of 5 or more, has a surface precision of several tens $\mu$m at most even if it is finished by abrasion after the particles are deposited on the surface. If the perforating unit incorporating the first roll having such a surface precision and the second roll is used, and the elongated film is caused to pass between the rolls, it is difficult to apply a uniform pressure to the elongated film, which is in contact with the rolls, along the direction of width of the film. Therefore, if an elongated film is perforated by the above-described unit, the following problems are posed.

(1) Since some portions of an elongated film do not receive a sufficiently high pressure because of the displacement of the first roll, the corresponding portions are not perforated. This makes it difficult to form uniform through pores and the like.

(2) Owing to the displacement of the first roll, the first and second rolls are intermittently rotated and hence cannot be smoothly rotated. As a result, wrinkles are left on the entire surface of the film.

(3) If the thickness of the film varies, it may be cut while it passes between the rolls. As a result, it is difficult to continuously form through pores or blind pores in the elongated film.

(4) If an elongated film made of a metal is used, biting is caused between the rolls to stop rotation of the rolls. As a result, through pores or the like cannot be formed.

Either the first roll or the second roll is movable. If the first roll is movable, the pressure control means are arranged near the two end portions of the first roll. If the second roll is movable, the pressure control means are arranged near the two end portions of the second roll. With this arrangement, even if the first roll incorporated in the unit and having particles fixed on its surface has a surface precision of several tens $\mu$m is, a pressure acting on the elongated film passing between the rolls rotated in the opposite directions can be controlled. That is, the pressure acting on the elongated film passing between the rolls can be made uniform along the direction of the width of the film. In addition, a dynamic external force, such as vibrations and shocks, acting between the rolls upon passage of the film is absorbed and reduced, and the rolls can be smoothly and continuously rotated. Therefore, the following effects can be obtained.

(1) Since a pressure applied from the rolls to an elongated film upon passage of the film between the first and second rollers which are rotated in the opposite directions can be made uniform along the direction of width of the film, through pores and blind pores can be uniformly formed in the film at a high density. In addition, since the perforating operation is performed by mechanical force using the large number of particles, each having acute corner portions and a Mohs hardness value of 5 or more, which are deposited on the surface of the first roll, a large number of uniform through pores and blind pores, each having a small size selected in the range of sub-$\mu$m to several tens $\mu$m, can be formed in the elongated film without almost any deterioration in essential properties of the film material.

(2) Since the first and second rolls can be smoothly rotated, perforation can be performed without leaving wrinkles on the elongated film. In addition, since each roll can be rotated at high speed, the perforation process performance with respect to the film can be greatly improved.

(3) Even if the thickness of the elongated film varies, it is not cut when it passes between the rolls, and through pores or blind pores can be continuously formed in the elongated film.

(4) Even if a metal elongated film is used, since biting between the rolls can be prevented, the film can be continuously perforated. The metal porous film manufactured by such a perforation process has excellent vapor and air permeability, and the glossiness of the surface of the film is improved.

The second roll can be made of a hard metal, such as stainless steel, and thus have a hard surface, thereby increasing the pressure applied on the film passing through the gap between the first roll and the second roll. Because of this increase in the pressure, through pores can be uniformly formed in an elongated film made of a metal such as copper, or an elongated film made of a composite material obtained by mixing an inorganic powder in a polymeric material. Uniform through pores can be made not only in the elongated film made of the above-mentioned material, but also in an elongated film made of a relatively soft material such as polymeric one. To form the pores in the soft film, it suffices to change, by means of the pressure control means, the pressure on the film to a value suitable for processing this film. In addition, the degree of perforation can be arbitrarily controlled.

The second roll can be formed by coating a polymeric resin layer on a roll body, and thus have a soft surface, thereby reducing the pressure applying on the film passing through the gap between the first and second rolls. Because of this reduction in the pressure, blind pores can be uniformly formed in the elongated film regardless of a film material. If the pressure control means is arranged in such a unit, the pressure between the first and second rolls can be increased by the pressure control means. Therefore, finer through pores can be formed in an elongated film made of a polymeric material in comparison with the case wherein the second roll having the hard surface is used.

By using the above-described manufacturing apparatus, a large number of uniform through pores, each having a small size arbitrarily selected in the range of sub-$\mu$m to several tens $\mu$m, are formed in an elongated film at a high density, thereby manufacturing a porous film having good vapor and air permeability. Especially, if this manufacturing apparatus is applied to an elongated film made of a polymeric material, a porous film having vapor and air permeability, which is suitable for a sanitary material such as a disposable paper diaper as a typical example, a medical material, or a clothing material can be manufactured. In addition, if the apparatus is applied to an elongated film made of a metal, an electromagnetically shielding porous film having air permeability can be manufactured.

A large number of uniform blind pores, each having a small size selected in the range of sub-$\mu$m to several tens $\mu$m, can be uniformly formed in the elongated film at a high density by the above-described manufacturing apparatus, thereby producing a porous film having vapor permeability and excellent hydraulic resistance to water pressure.

If two or more units, each identical to the perforating unit incorporating the pressure control means, are arranged in the traveling direction of the elongated film, a porous film can be made from a relatively thick film in which through pores or the like, each having a sufficient depth, cannot be formed by one perforating operation. Assume that two units are arranged. In this case, after an elongated film is caused to pass between the first and second rolls of the unit of the first row to be perforated, the elongated film is caused to pass between the first and second rolls of the unit of the second row while the opposite surface of the film to the perforated surface is in contact with the first roll (on which a large number of particles, each having a Mohs hardness value of 5 or more, are deposited) so as to perforate the upper and lower surfaces of the film. With this operation, a porous film can be manufactured from a relatively thick film. In addition, if the particle size of each of a large number of particles, each having a Mohs hardness value of 5 or more, deposited on the first roll of the unit of the first row is set to be different from that of particles deposited on the first roll of the unit of the second row, a large number of through pores having different diameters can be uniformly formed in the elongated film.

In addition, the manufacturing apparatus having the above-described arrangement is designed to form through pores or blind pores in an elongated film by using a perforating unit mainly based on friction. For this reason, a large amount of static electricity is generated on the surface of a film upon perforation, thus attracting surrounding dust. If a destaticizing means is arranged at the outlet of the unit to eliminate a large amount of static electricity generated on the surface of the elongated film upon perforation, dust can be remove from the surface of the film. Especially, since the destaticizing means is constituted by a vessel for storing pure water, and an ultrasonic wave generating member for applying ultrasonic waves to the pure water, dust can be very easily washed out.

Furthermore, according to the present invention, there is provided a porous film manufacturing apparatus characterized in that an arc radiation means for radiating an arc on a film conveyed from the perforating unit described above is arranged at the outlet of unit.

The arc radiation means comprises a rotatable dielectric roll arranged to be separated from the film conveyed from the unit and having a surface on which a large number of fine projections are formed, and an electrode, arranged to oppose the dielectric roll, for inducing high-voltage discharge between the electrode and the dielectric roll to radiate an arc in the direction of width of the film.

As the dielectric roll, for example, a roll obtained by coating a dielectric layer on the surface of a metal roll is used. The dielectric material includes, e.g., various types of polymeric resins such as silicone rubber, or inorganic materials such as silicon ($SiO_2$) and silicon nitride.

The large number of fine projections on the surface of the dielectric roll are formed by coating a dielectric cloth having a stitch spacing on the micron order on the surface of the roll. The dielectric cloth makes of polyester, nylon, or the like.

The gap between the dielectric roll and the film is preferably set within the range of 1 to 5 mm. This is because if the gap falls outside the range, and a high voltage is applied between the dielectric roll and the electrode, it is difficult to radiate an arc having a sufficient power onto blind pores formed in the film.

Two or more units, each identical to the perforating unit incorporating the pressure control means, may be arranged in the traveling direction of the elongated film in the same form as that of the manufacturing apparatus described above.

A destaticizing means may be arranged at the outlet of the arc radiation means in the same form as that of the manufacturing apparatus described above According to the porous film manufacturing apparatus having such an arrangement, since the arc radiation means is arranged at the outlet of the perforating unit, through pores can be more uniformly formed in an elongated film made of a polymeric material or a composite material at a higher density.

More specifically, when a large number of through pores are to be formed in the elongated film by a perforating operation using the above-described unit, blind pores may be formed in the film. By radiating an arc on the film after such an perforating operation by using the arc radiation means, the blind pores are perforated by the arc, and hence all the pores in the film can be formed into through pores.

Blind pores can be formed in the elongated film made of the above-mentioned material by using the unit, thus mechanical damage to film portions around the blind pores can be suppressed as compared with a case wherein through pores are formed. Since an arc is radiated from the arc radiation means onto the film after such a perforating operation, the large number of blind pores are perforated by the arc. As a result, a large number of through pores can be more uniformly formed in the film at a higher density without causing a decease in strength of the film portions around the through pores.

Especially, if the arc radiation means comprises a rotatable dielectric roll arranged to be separated from the film conveyed from the unit and having a surface on which a large number of fine projections (e.g., a dielectric cloth coated on the surface and having a stitch spacing on the micron order) are formed, and an electrode, arranged to oppose the dielectric roll, for inducing high-voltage discharge between the electrode and the dielectric roll to radiate an arc in the direction of width of the film, an arc can uniformly radiated on blind pores of the film which correspond to the projections (stitches of the cloth). Assume that a dielectric roll having a surface on which a dielectric cloth having a stitch spacing on the micron order serving as fine projections is not coated is used. In this case, when perforation of the blind pores is performed by the arc, the arc is concentrically radiated in some pores. As a result, through pores having larger diameters than the blind pores may be formed or the diameters of the through pores may vary. In addition, blind pores may be left. If, however, a dielectric roll having a surface on which a dielectric cloth having a stitch spacing on the micron order serving as fine projections is coated is used, the blind pores of the film can be uniformly perforated, thus forming through pores on the micron order.

The manufacturing apparatus additionally including the arc radiation means forms blind pores in an elongated film by using a perforating unit based on friction. In addition, static electricity is added by corona discharge when arc radiation is performed. For this reason, a large amount of static electricity is generated on the surface of the film upon arc radiation, thus attracting surrounding dust. By arranging a destaticizing means at the outlet of the arc radiation means, a large amount of static electricity generated on the surface of the elongated film upon the abovedescribed perforation can be eliminated, thus removing dust attached to the surface of the film. Especially, by using the destaticizing means constituted by a vessel for storing pure water and an ultrasonic wave generating means for applying ultrasonic waves to the pure water, dust can be easily washed out.

Furthermore, according to the present invention, there is provided a porous film manufacturing apparatus comprising:

feed means for feeding an elongated film;

a perforating unit including a first rotatable roll having a surface on which a large number of particles, each having acute corner portions and a Mohs hardness value of not less than 5, are deposited, a second roll which has a surface consisting of a hard material and is rotatable in a direction reverse to a rotating direction of the first roll, and a third roll which has a surface consisting of a soft material and is rotatable in a direction reverse to the rotating direction of the first roll, the first to third rolls being arranged to oppose each other with the first roll being a middle roll of the first to third rolls and to cause the elongated film to pass between the first and second rolls and between the first and third rolls, the first roll being stationary and the second and third rolls being movable in a direction to oppose the first roll;

first pressure control means, arranged near two end portions of the second roll of the unit, for controlling pressures applied from the first and second rolls to the film; and second pressure control means, arranged near two end portions of the third roll of the unit, for controlling pressures applied from the first and third rolls to the film.

Similar to the manufacturing apparatus described above, the first roll has a structure in which a large number of particles, each having acute corner portions and a Mohs hardness value of 5 or more, are electrodeposited on the surface of a metal roll body or are bonded thereto with an organic or inorganic binder.

As the second roll, an iron roll, an iron-based alloy roll, an iron roll having an Ni- or Cr-plated surface, or the like may be used.

As the third roll, a roll formed by coating a polymeric resin layer on an iron roll body, a roll made of brass, aluminum, or copper, or the like may be used. Although various types of resins may be used as the polymeric resin, an urethane resin, silicone rubber, or the like which has a good cushioning effect with respect to the elongated film is especially preferable.

The perforating unit is preferably constituted by the first to third rolls, shafts extending through the centers of the rolls, and boxes, incorporating bearings for axially supporting both end portions of shafts.

The first to third rolls constituting the perforating unit may be horizontally or vertically arranged. In order to facilitate assembly of the apparatus and to improve its operability, however, these rolls are preferably arranged such that the second and third rolls oppose each other with respect to the first roll as the center.

The perforating unit may be operated in such a manner that pressure control between the first and third rolls is released by a second pressure control means arranged at the third roll constituting the unit, and an elongated film is pressed and perforated between only the fist and second rolls constituting the unit. Alternatively, pressure control between the first and second rolls is released by a first pressure control means arranged at the second roll constituting the unit, and an elongated film is pressed and perforated between only the first and third rolls constituting the unit. It is apparent that an elongated film can be pressed and perforated between the first and second rolls and between the first and third rolls constituting the unit.

The first pressure control means preferably include springs for biasing the boxes arranged near the two end portions of the second roll of the unit toward the first roll.

The second pressure control means preferably include springs for biasing the boxes arranged near the two end portions of the third roll of the unit toward the first roll.

Two or three or more units, each identical to the perforating unit including the first and second pressure control means, may be arranged in the traveling direction of the elongated film. If, for example, two units are arranged, a large number of particles, each having a Mohs hardness value of 5 or more, which are deposited on the first rolls of the units of the first and second rows may have different particle diameters. In this case, after an elongated film is caused to pass between the first and second rolls of the unit of the first row to be perforated, the elongated film is caused to pass between the first and second rolls of the unit of the second row while the opposite surface of the film to the perforated surface is in contact with the first roll (on which a large number of particles, each having a Mohs hardness value of 5 or more, are deposited) so as to perforate the upper and lower surfaces of the film.

A destaticizing means having the same arrangement as described above may be arranged at the outlet of the perforating unit.

According to the porous film manufacturing apparatus having such an arrangement, a large number of uniform through pores and blind pores, each having a small size of sub-μm to several tens μm, can be uniformly and continuously formed in elongated films made of various types of materials such a polymeric materials and metals by using on perforating unit constituting the first to third rolls without almost any deterioration in essential characteristics of film materials.

More specifically, if pressure control between the first and third rolls by the second pressure control means arranged at the third roll constituting the perforating unit is released, and an elongated film is pressed between the first and second rolls constituting the unit, since the second roll has the hard surface, uniform through pores can be formed in the elongated film made of a metal such as copper, a polymeric material, or a compound material obtained by mixing a polymeric material with an inorganic powder. In addition, since a pressure acting between the first and second rolls can be controlled by the first pressure control means arranged at the second roll, through pores can be uniformly formed in an elongated film consisting of a polymeric material, and the degree of perforation can also be arbitrarily controlled.

Furthermore, if pressure control between the first and second rolls by the first pressure control means arranged at the second roll constituting the unit is released, and an elongated film is pressed between only the first and third rolls constituting the unit, since the third roll has the soft surface and has a cushioning effect with respect to the film, a large number of blind pores can be formed in the film.

It is apparent that the elongated film is pressed between the first and second rolls and between the first and third rolls constituting the unit, through pores and blind pores can be simultaneously formed in the film.

If two or more units, each identical to the perforating units including the first and second pressure control means, are arranged in the traveling direction of the elongated film, a porous film can be manufactured from a relatively thick film in which through pores and the like, each having a sufficient depth, cannot be formed by one operating operation. In a case wherein two units are arranged, after an elongated film is caused to pass between rolls of the unit of the first row (e.g., the first and second rolls) to be perforated, the elongated film is caused to pass between rolls of the unit of the second row (e.g., the first and second rolls) while the film surface opposite to the perforated surface is in contact with the first roll (on which a large number of particles, each having a Mohs hardness value of 5 or more, are deposited) so as to perforate the upper and lower surfaces of the film, thus manufacturing a porous film from a relatively thick film. In addition, a large number of particles, each having a Mohs hardness value of 5 or more, which are deposited on the first rolls of the units of the first and second rows may be set to be different from each other so that a large number of through pores or the like having different diameters can be uniformly formed in the elongated film.

Furthermore, by arranging a destaticizing means at the outlet of the perforating unit, a large amount of static electricity generated on the surface of the elongated film upon the above-described perforation can be eliminated, thus easily removing dust attached to the surface of the film. Especially, by using the destaticizing means constituted by a vessel for storing pure water and an ultrasonic wave generating means for applying ultrasonic waves to the pure water, dust can be easily washed out.

Moreover, according to the present invention, there is provided a porous film manufacturing apparatus characterized in that an arc radiation means for radiating an arc on a film conveyed from the perforating unit described above is arranged at the outlet of a unit constituted by the first and third rolls of the manufacturing apparatus described above.

The arc radiation means comprises a rotatable dielectric roll arranged to be separated from the film conveyed from the unit and having a surface on which a large number of fine projections are formed, and an electrode, arranged to oppose the dielectric roll, for inducing high-voltage discharge between the electrode and the dielectric roll to radiate an arc in the direction of width of the film.

A destaticizing means having the same arrangement as that described above may be arranged outlet the arc radiation means.

According to the porous film manufacturing apparatus having such an arrangement, since the arc radiation means is arranged at the outlet of the perforating unit constituted by the first to third rolls, through pores can be more uniformly formed in an elongated film consisting of a polymeric material or a compound material at a higher density.

Furthermore, by arranging a destaticizing means at the outlet of the arc radiation means, a large amount of static electricity generated on the surface of the elongated film upon the above-described perforation can be eliminated, thus easily removing dust attached to the surface of the film. Especially, by using the destaticizing means constituted by a vessel for storing pure water and a ultrasonic wave generating means for applying ultrasonic waves to the pure water, dust can be easily washed out.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

Preferred embodiments of the present invention will be described in detail below with reference to the accompanying drawings.

FIRST EMBODIMENT

Figure 1:
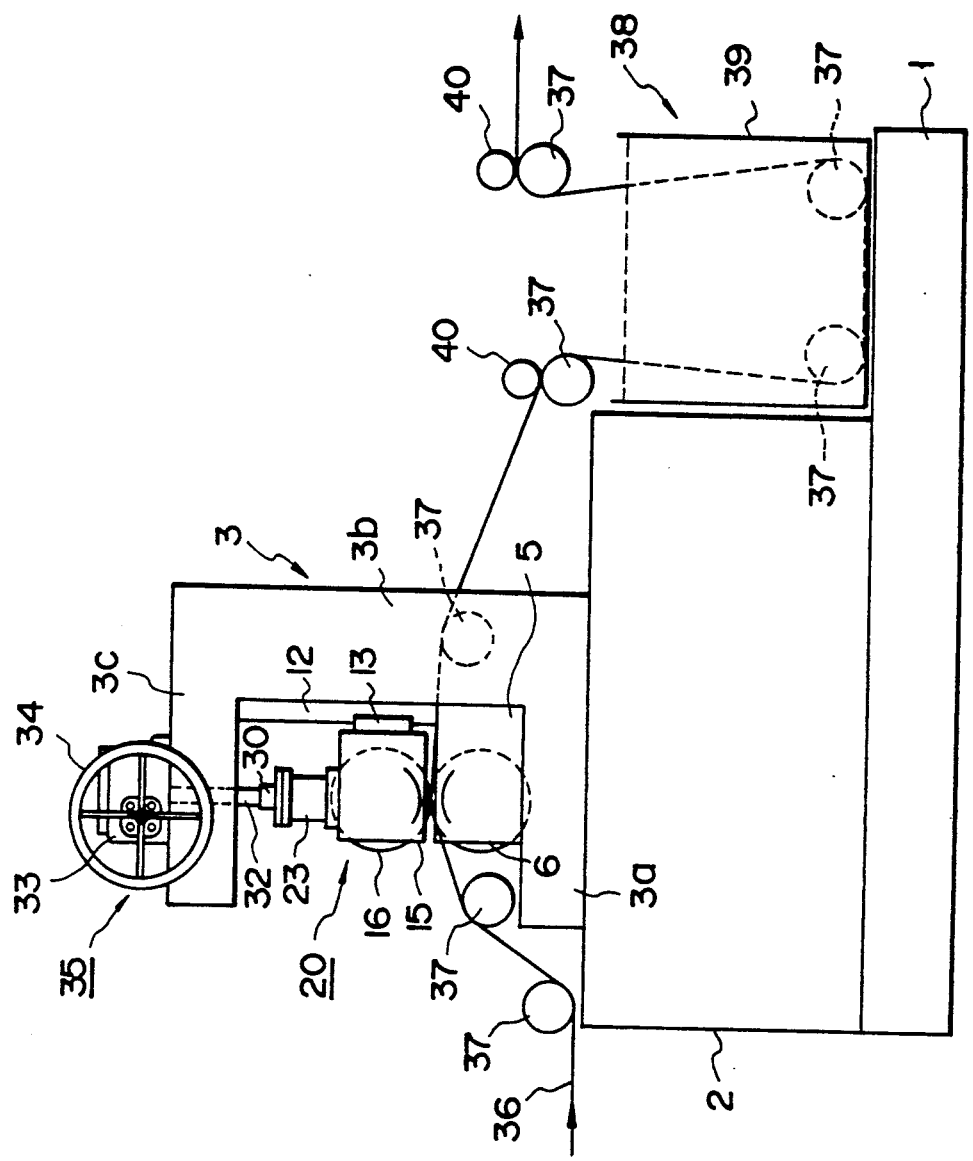
FIG. 1 is a front view showing a porous film manufacturing apparatus according to the first embodiment of the present invention.
Figure 2:
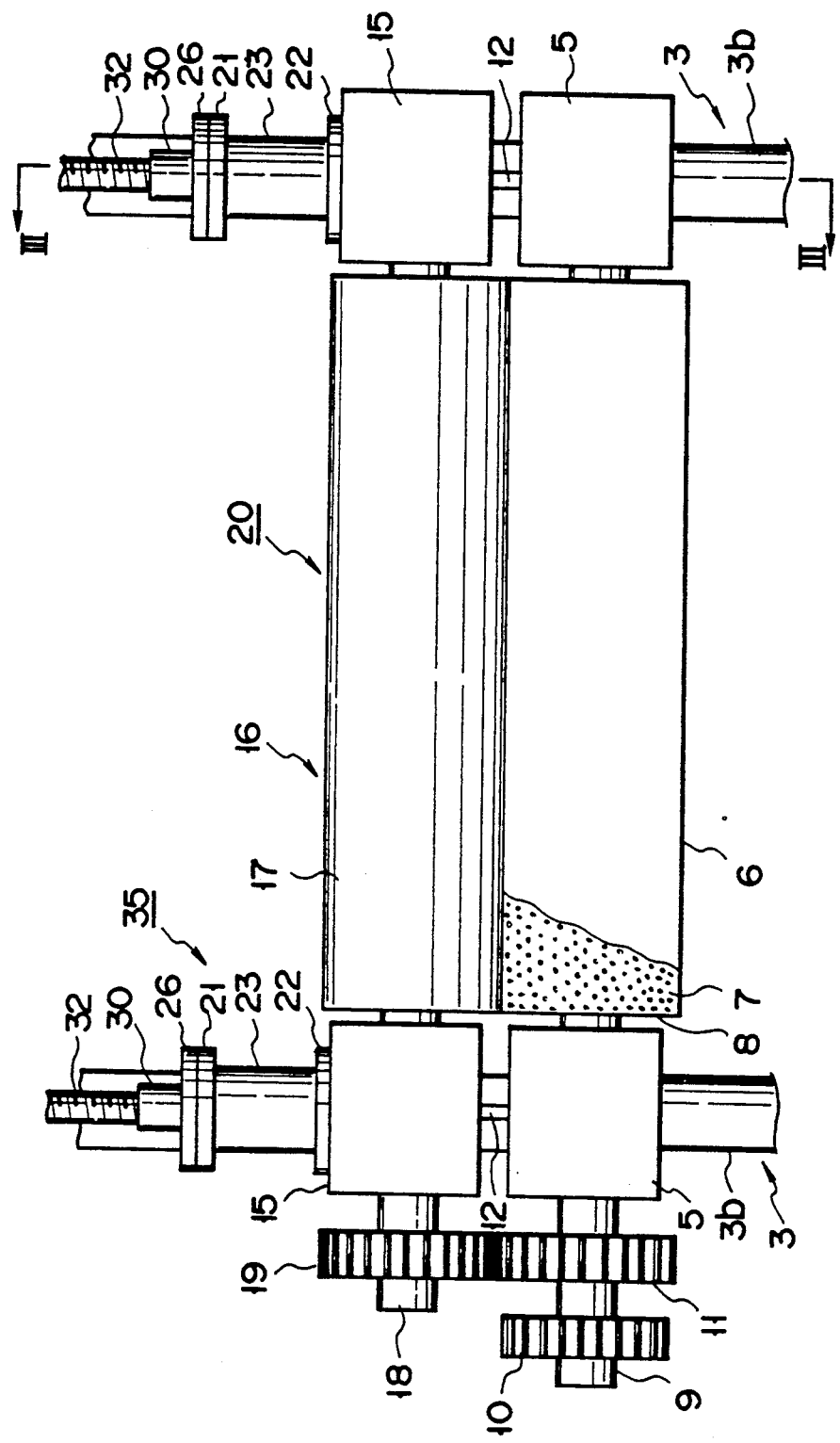
FIG. 2 is a side view showing a main part of the manufacturing apparatus in FIG. 1.
Figure 3:
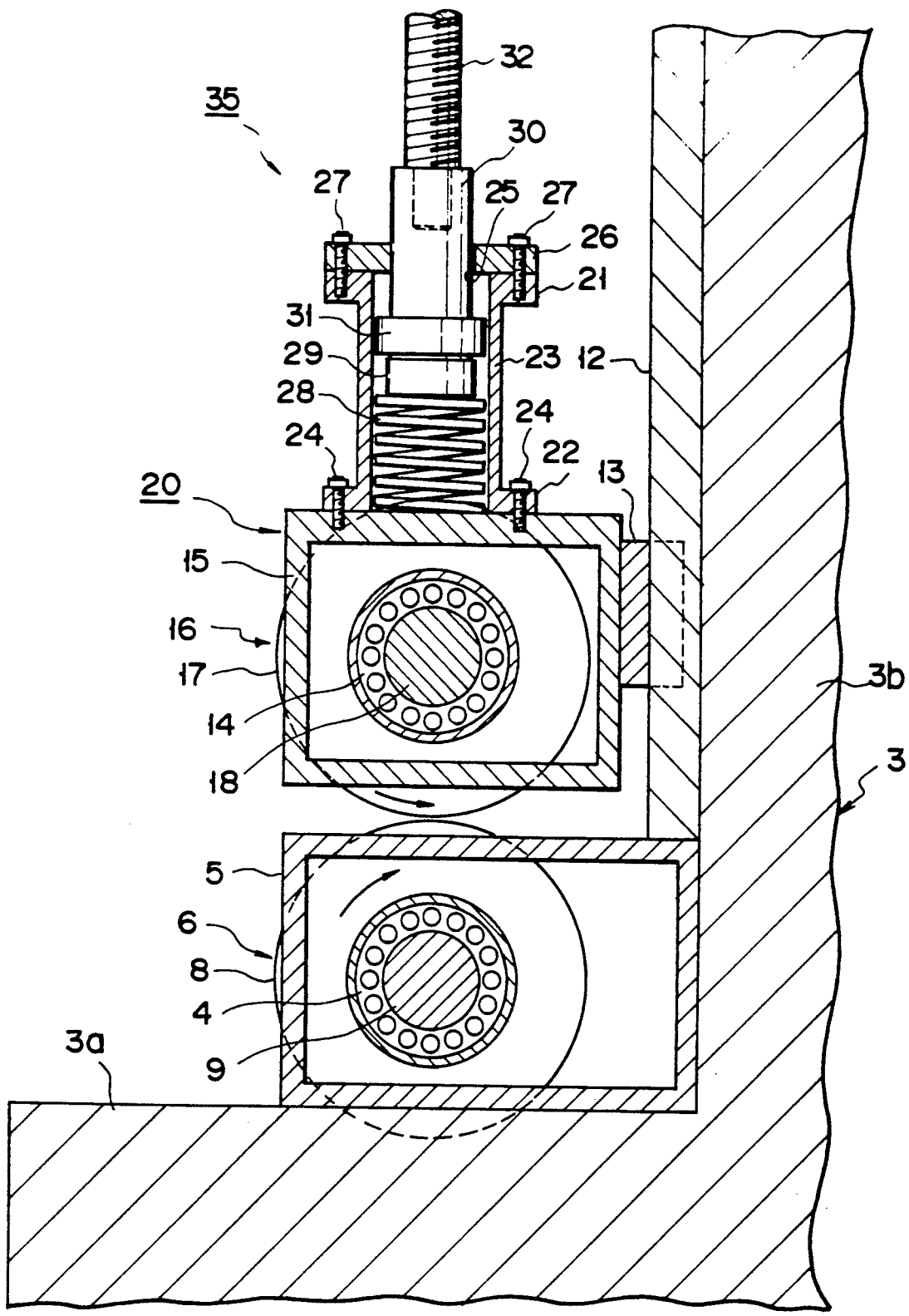
FIG. 3 is a sectional view taken along a line III—III in FIG. 2.

FIG. 1 is a front view showing a porous film manufacturing apparatus according to the first embodiment of the present invention. FIG. 2 is a side view showing a main part of the manufacturing apparatus in FIG. 1. FIG. 3 is a sectional view taken along a line III—III in FIG. 2. Referring to FIG. 1, reference numeral 1 denotes a bed. A table 2 is arranged on the upper surface of the bed 1 except for a portion near its right end. Two hook-shaped frames 3 are arranged on the table 2 to be spaced apart by a predetermined distance in the direction of width of the table 2. Each frame 3 is constituted by a lower plate 3a, a side plate 3b, and an upper plate 3c. A first box 5 incorporating a bearing is fixed to each corner portion, of the frame 3, at which the lower and side plates 3a and 3b join. A first roll 6 is arranged between the frames 3. As shown in FIG. 2, the first roll 6 consists of an iron roll body 8 and a shaft 9. The roll body 8 is designed such that a large number of particles (e.g., synthetic diamond particles) 7, each having a particle size of 70 to 85 μm, acute corner portions, and a Mohs hardness value of 5 or more, are electro-deposited on the surface of the main body at an area ratio of 70% or more. The shaft 9 extends through the center of the main body 8 to protrude from the two end faces of the main body 8. The two end portions of the shaft 9 are axially supported by the bearings 4 in the boxes 5, respectively. A portion of the shaft 9 on one end side (e.g., the left end side) of the first roll 6 extends through the box 5, while the protruding portion of the shaft 9 is fitted in a gear 10 which is meshed with a gear of the driving shaft of a motor (not shown). With this arrangement, when the motor is driven, the first roll 6 is rotated, e.g., clockwise. In addition, a gear 11 which is meshed with a gear of a second roll (to be described later) is fitted on the protruding portion of the shaft 9 which is located between the gear 10 and the left side surface of the box 5.

Rails 12 are respectively formed o the side plates 3b of the frames 3 located above the boxes 5. As shown in FIG. 3, sliders 13 (only one slider is shown) are respectively arranged on the rails 12 to be vertically movable. Second boxes 15, each incorporating a shaft 18, are respectively fixed to the sliders 13 so as to be vertically moved along the rails 12. A second roll 16 is arranged between the frames 3 to oppose the first roll 6. The second roll 16 is constituted by a roll body 17 made of, e.g., stainless steel, and the shaft 18 extends through the main body 17 to protrude from the two end faces of the main body 17. The two protruding end portions of the shaft 18 are axially supported by bearings 14 in the boxes 15, respectively. A portion of the shaft 18 on one end side (e.g., the left end side) of the second roll 16 extends through the second box 15, while the protruding portion of the shaft 18 is fitted in a gear 19 which is meshed with the gear 11 of the shaft 9 of the first roll 6. With this arrangement, the second roll 16 can be freely moved vertically along the rails 12 through the second box 15 and the sliders 13. In addition, when the shaft 9 of the first roll 6 is rotated clockwise by the motor, the shaft 18 having the gear 19 meshed with the gear 11 of the shaft 18 is rotated counterclockwise. As a result, the second roll 16 is rotated counterclockwise.

A perforating unit 20 comprises the two frames 3, the two shafts 9, 18, the two first boxes 5, the first roll 6, the two rails 12, the two sliders 13, the two bearings 4,14, the two second boxes 15, and the second roll 16.

Cylindrical members 23, each having upper and lower flanges 21 and 22, are respectively arranged on the upper walls of the two second boxes 15. Each cylindrical member 23 is fastened to a corresponding one of the boxes 15 with a plurality of screws 24 threadably engaged with the upper wall of the box 15 through the lower flange 22. A disk 26 having a pore in its center is mounted on the upper flange 21 of each cylindrical member 23. Each disk 26 is fixed to a corresponding one of the upper flanges 21 with a plurality of screws 27 threadably engaged with the upper flange 21 through the disk 26. A coil spring 28 is housed in each cylindrical member 23 to vertically apply an elastic force. The lower end of each coil spring 28 is in contact with the upper wall of a corresponding one of the second boxes 15. A rod 30 having a pressure sensor 29 attached to its lower end is inserted into each cylindrical member 23 through the hole 25 in the disk 26. The pressure sensors 29 are respectively brought into contact with the upper ends of the coil springs 28 to detect pressures acting on the coil springs 28 upon downward movement of the rods 30. A disk-like guide 31 is attached to a portion of each rod 30 above a corresponding one of the sensors 29 so as to allow smooth vertical movement of the rod 30. A ball screw 32 is inserted in the upper end portion of each rod 30. Each ball screw 32 extends through the upper plate 3c of the frame 3 to protrude upward therefrom. Casings (only one casing is shown) 33, each incorporating a threaded engaging plate (not shown), are respectively arranged on the upper surfaces of the upper plates 3c. The protruding upper end portions of the ball screws 32 are threadably engaged with the engaging plates in the casings 33, respectively. A worm shaft (not shown) engaged with the protruding upper end portion of the ball screw 32 is horizontally inserted in each casing 33, while a handle 34 (the other handle is not shown) is arranged on one end of each worm shaft. With this arrangement, when the handle 34 is rotated, the ball screw 32 engaged with the worm shaft of the handle 34 is rotated to lower (or raise) the rod 30 in which the bal screw 32 is inserted. In this case, when the rod 30 is moved upward by a predetermined distance or more, the disk-like guide 31 attached to the rod 30 is brought into contact with the inner surface of the disk 26 on the upper portion of the cylindrical member 23, thus raising the cylindrical member 23 itself. As a result, the second boxes 15 fixed to the lower ends of the cylindrical members 23 are respectively moved upward along the rails 12 through the sliders 13.

A pressure control means 35 for controlling pressing a pressure on a film passing between the first and second rolls 6 and 16 is constituted by the two cylindrical members 23, the two disks 26, the two coil springs 28, the two pressure sensors 29, the two rods 30, the two disk-like guides 31, the two ball screws 32, the two casing 33, the two worm shafts (not shown), and the two handles 34.

A winding roll (not shown) as an elongated film feed means is arranged in front of the perforating unit 20. An elongated film 36 is fed from the winding roll to a position between the first and second rolls 6 and 16 of the unit 20 through two feed rolls 37. A destaticizing means 38 is arranged at the outlet of the unit 20. The destaticizing means 39 is constituted by a vessel 39, arranged on the bed 1, in which pure water is stored, and an ultrasonic wave generating member (not shown) for applying ultrasonic waves on the pure water. Five feed rolls 37 for conveying the elongated film 36 passing between the first and second rolls 6 and 16 are arranged between the unit 20 and the destaticizing means 38, in the vessel 39, and at the outlet of the vessel 39, respectively. Note that abutment rolls 40 are respectively arranged in contact with the two feed rolls 37 located at the inlet and outlet of the vessel 39. A plurality of hot air blasting members (not shown) and a take-up roll (not shown) are sequentially arranged at the outlet of the destaticizing means 38. The hot air blasting members serve to dry the film 36 passing between the feed roll 37 and the abutment roll 40.

An operation of the porous film manufacturing apparatus having the above-described arrangement will be described below.

When the two handles 34 of the pressure control means 35 are rotated, e.g., clockwise, the ball screws 32 respectively engaged with the worm shafts of the handles 34 are rotated to raise the rods 30 coupled to the ball screws 32. When the rods 30 are raised, the disk-like guides 31 attached to the rods 30 are respectively brought into contact with the inner surfaces of the disks 26 on the upper portions of the cylindrical members 23. As a result, each cylindrical member 23 itself is moved upward. When the cylindrical member 23 are moved upward, the second boxes 15, of the perforating unit 20, which are fixed to the lower ends of the cylindrical members 23, are raised along the rails 12 attached to the frames 3 through the sliders 13, respectively. The second roll 16 axially supported by the bearings 14 in the second boxes 15 is separated from the first roll 6 located therebelow by a predetermined distance. In this state, the elongated film 36 made of, e.g., polyethylene is fed from the winding roll (not shown) and is conveyed between the first and second rolls 6 and 16 of the unit 20 by the two feed rolls 37. Thereafter, the film 36 is conveyed by the five rolls 37 to pass through the vessel 39 of the destaticizing means 38. The film 36 is further conveyed to pass through the plurality of hot air blasting members (not shown), and the leading end of the film 36 is wound around the takeup roll (not shown).

After the leading end of the elongated film 36 is taken up by the take-up roll, the two handles 34 of the pressure control means 35 are rotated counterclockwise. The ball screws 32 engaged with the worm shafts of the handles 34 are then rotated, and the rods 30 coupled to the ball screws 32 are moved downward. When the rods 30 are lowered, the pressure sensors 29 respectively located in the cylindrical members 23 on the lower ends of the rods 30 press the coil springs 28, located therebelow, downward. When the coil springs 28 are pressed downward, the upper walls of the second boxes 15 with which the lower ends of the coil spring 28 are brought into contact are pressed downward. As a result, the second boxes 15 are lowered along the rails 12 of the frames 3 through the sliders 13, and the second roll 16 axially supported by the bearings 14 in the second boxes 15 is brought into contact with the first roll 6 located therebelow. When the handles 34 are further rotated in the same direction to lower the rods 30, the sensors 29 on the lower ends of the rods 30 respectively compress the coil springs 28 located therebelow. Upon compression of the coil springs 28, pressures are applied to the upper walls of the second boxes 15, and between the second roll 16, which is axially supported by the bearings 14 in the second boxes 15, and the first roll 6. In this case, a pressure acting on the elongated film 36 located between the first and second rolls 6 and 16 is controlled by detecting the pressures (compressing forces) between the first and second rolls 6 and 16 by means of the sensors 29, and controlling the rotation of the handles 34 clockwise/counterclockwise. When pressure control for the unit 20 is performed by the pressure control means 35 in this manner, a uniform pressure is applied to the elongated film 36, located between the first and second rolls 6 and 16, along the direction of the width of the film 36, thereby completing the preparation of a perforating operation.

Upon completion of the perforating operation, ultrasonic waves are applied from the ultrasonic wave generating member to the pure water stored in the vessel 39 of the destaticizing means 38. Subsequently, the take-up roll is rotated, and at the same time, the driving shaft of the motor is rotated. Upon transmission of the rotating force from the gear of the driving shaft to the gear 10 of the shaft 9 of the first roll 6, the first roll 6 is rotated clockwise. When the first roll 6 is rotated, the second roll 16 is rotated counterclockwise upon transmission of the rotating force from the gear 11 of the shaft 9 to the gear 19 of the shaft 18. When the first and second rolls 6 and 16 are rotated in this manner, the elongated film 36 passing between the rolls 6 and 16 is perforated.

As shown in FIG. 2, the first roll 6 has the iron roll body 8 which is designed such that the large number of synthetic diamond particles 7, each having acute corner portions, are electro-deposited on the surface of the main body at an area ratio of 70% or more. In addition, the second roll 16 has the roll body 17 made of stainless steel, and thus have a hard surface. With these structures, when the elongated film 36 passes between the first and second rolls 6 and 16, the film 36 is perforated by the acute corner portions of the large number of synthetic diamond particles 7 on the surface of the first roll 6. As a result, a large number of through pores, each having a size of sub-$\mu$m to several tens $\mu$m, are uniformly formed in the elongated film 36. In addition, since pressure control for the unit 20 is performed by the pressure control means 35, even if the first roll 6 having a surface precision of several tens $\mu$m is incorporated in the perforating unit 20, a uniform pressure is applied to the elongated film 36, located between the first and second rolls 6 and 16, in the direction of entire width. Therefore, external forces, such as vibrations and shocks, acting between the first and second rolls 6 and 16 upon passage of the elongated film 36 are absorbed and reduced, and the first and second rolls 6 and 16 are smoothly and continuously rotated. As a result, the large number of through pores are uniformly formed in the elongated film 36 at a high density. More specifically, if the first roll 6 has the iron roll body 8 which is designed such that diamond particles having an average particle diameter of 40 $\mu$m are electro-deposited on the surface of the main body at an area ratio of 70%, and the elongated film 36 is perforated by the first roll 6 at a perforation efficiency of 50%, 26,000 through pores can be formed in the elongated polyethylene film 36 per cm$^2$.

The elongated film 36 perforated by the unit 20 is conveyed by the five feed rolls 37 and the two abutment rolls 40 to pass through the vessel 39 of the destaticizing means 38. Since a perforating operation of the unit 20 with respect to the elongated film 36 is mainly based on the friction between the first and second rolls 6 and 16, a large amount of static electricity is generated on the surface of the film 36 upon perforation, thus attracting surrounding dust. After the perforating operation, the elongated film 36 is conveyed to pass through the vessel 39, of the destaticizing means 38, in which the pure water is stored, and ultrasonic waves are applied to the pure water by the ultrasonic wave generating member (not shown). With this operation, the dust attached to the elongated film 36 is easily washed out. The elongated film 36 having the large number of through pores from which the dust is washed out passes through the plurality of hot air blasting members so that water on the surface is evaporated and removed. The film 36 is then taken up by the take-up roller.

The above-described porous film manufacturing apparatus of the first embodiment, therefore, has the following advantages.

(1) Since pressure control for the perforating unit 20 is performed by the pressure control means 35, even if the first roll 6 having a surface precision of several tens $\mu$m is incorporated in the perforating unit 20, a uniform pressure can be applied to the elongated film 36, which passes between the first and second rolls 6 and 16, throughout in the direction of the width. Therefore, a large number of through pores can be uniformly formed in the elongated film 36 at a high density. In addition, since the perforating operation is performed by a mechanical force using the large number of synthetic diamond particles 7 deposited on the surface of the first roll 6 and having the acute corner portions, a large number of uniform through pores, each having a size arbitrarily selected in the range of sub-$\mu$m to several tens $\mu$m, can be formed in the elongated film 36 made of, e.g., polyethylene without almost any deterioration in essential characteristics (e.g., strength, softness and transparency) of the film material.

(2) Since the first and second rolls 6 and 16 are smoothly rotated, perforation can be performed without leaving wrinkles on the elongated film 36. In addition, since the first and second rolls 6 and 16 can be rotated at high speed, the perforation performance with respect to the elongated film 36 can be greatly improved.

(3) Even if the thickness of the elongated film 36 varies, through pores can be continuously formed in the film 36 without cutting the film in the process of conveying the film 36 between the first and second rolls 6 and 16.

(4) Even if the elongated film 36 is made of a metal, since biting or catching of the film 36 between the first and second rolls 6 and 16 can be prevented, the film 36 can be continuously perforated.

Furthermore, since the elongated film 36 is conveyed to pass through the destaticizing means 38 after a perforating operation, a dust-free, easy-to-handle porous film can be taken up by the take-up roll.

In the manufacturing apparatus of the first embodiment, the roll body 17 of the second roll 16 is made of stainless steel. However, the present invention is not limited to this. For example, the second roll may be formed by coating a polymer resin layer, e.g., an urethane resin on a roll body, and thus have a soft surface. If a perforating unit incorporating the second roll having such a structure is used, since a pressure acting on an elongated film passing between the first and second rolls can be reduced, blind pores can be uniformly formed in the film regardless of a material for the film. Furthermore, since the unit includes the pressure control means, the pressure between the first and second rolls can be increased by the pressure control means. Therefore, in comparison with a case wherein the second roll is made of stainless steel, finer through pores can be formed in an elongated film, especially an elongated film made of a polymeric material.

In addition, in the manufacturing apparatus of the first embodiment, two rows of units, each identical to the perforating unit 20, may be arranged in the conveying direction of the elongated film 36. In the manufacturing apparatus having such an arrangement, after an elongated film is conveyed between the first and second rolls of the unit of the first row to be perforated, the elongated film is conveyed between the first and second rolls of the unit of the second row such that the film surface opposite to the perforated surface is brought into contact with the first roll (having a large number of synthetic diamond particles electro-deposited thereon), thereby perforating the upper and lower surfaces of the film. With this process, a porous film can be manufactured by using a relatively thick film. If the particle size of each of a large number of synthetic diamond particles electrodeposited on the first roll of the perforating units of the first row is set to be different from that on the first roll of the perforating unit of the second row, a large number of through pores and blind pores having different diameters can be uniformly formed in the elongated film at a high density.

Moreover, if the pressure control means 35 includes the handles 34 for vertically moving the cylindrical members 23 fixed on the upper walls of the second boxes 15, the means 35 can have a function of vertically moving the second roll 16 itself in addition to the pressure control function for the perforating unit 20. This arrangement can greatly improve operability in setting the elongated film 36 and replacing the first roll 6 arranged below the second roll 16 with another roll having a large number of synthetic diamond particles, each having a size different from that of the first roll 6, electro-deposited thereon.

SECOND EMBODIMENT

Figure 4:
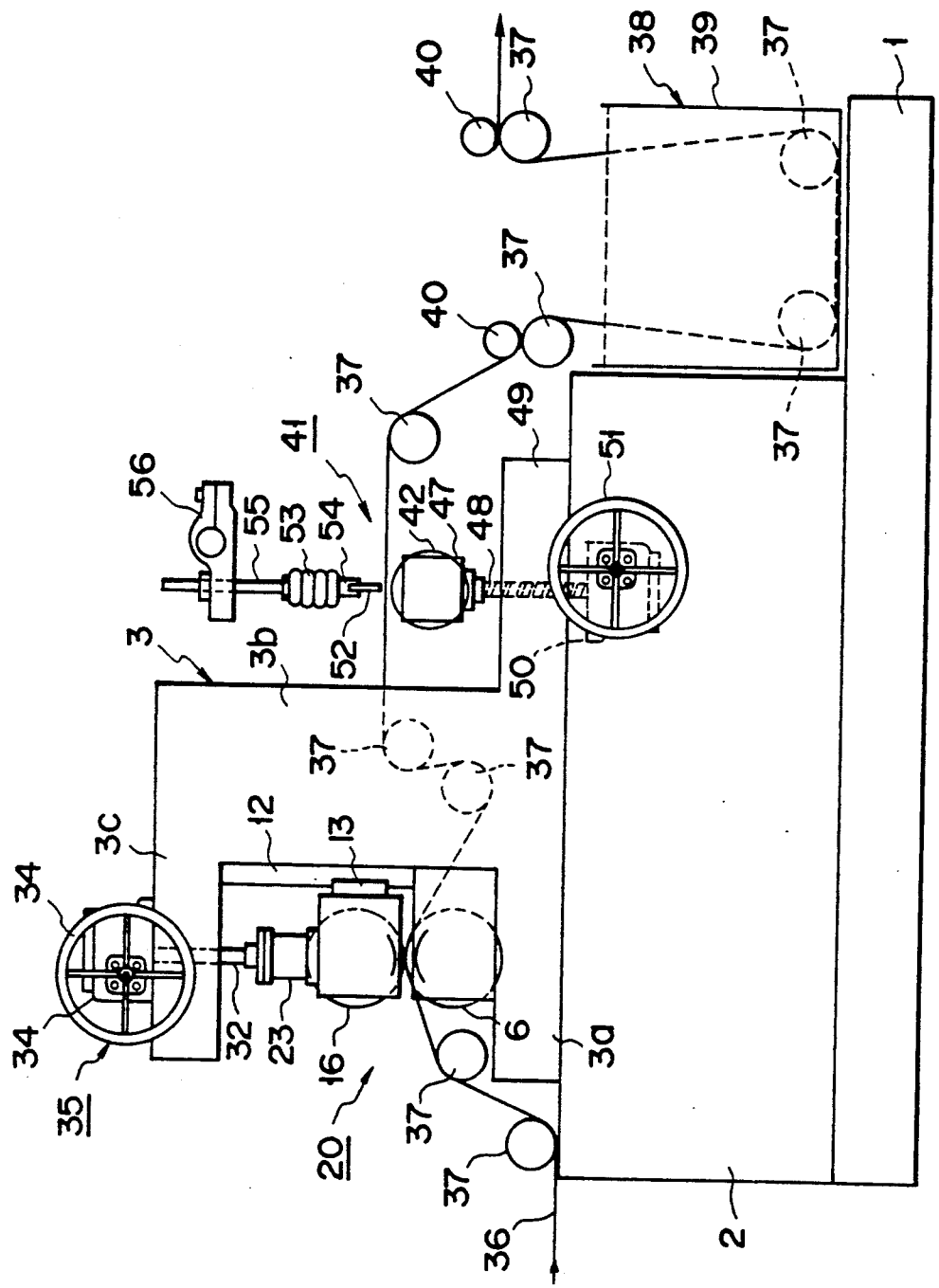
FIG. 4 is a front view showing a porous film manufacturing apparatus according to the second embodiment of the present invention.
Figure 5:
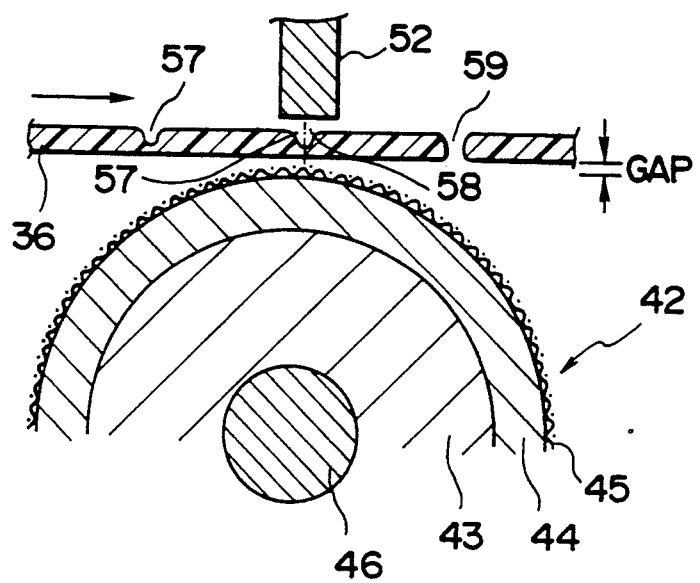
FIG. 5 is a sectional view showing a main part of an arc radiation means incorporated in the apparatus shown in FIG. 4.

FIG. 4 is a front view showing a porous film manufacturing apparatus according to the second embodiment of the present invention. FIG. 5 is a sectional view showing a main part of an arc radiation means incorporated in the apparatus in FIG. 4. Note that the same reference numerals in FIGS. 4 and 5 denote the same parts as in FIG. 1 to 3, and a description thereof will be omitted. In the manufacturing apparatus shown in FIG. 4, an arc radiation means 41 is arranged between the perforating unit 20 and the destaticizing means 38 described above.

The arc radiation means 41 includes a rotatable dielectric roll 42 having a surface on which a large number of fine projections are formed. As shown in FIG. 5, the dielectric roll 42 comprises: an iron roll body 43; a dielectric layer 44 made of, e.g., silicone rubber and coated on the surface of the roll body 43; a nylon bolting cloth 45, having a stitch spacing of, e.g., 5 $\mu$m and coated on the surface of the dielectric layer 44, for forming the large number of fine projections; and a shaft 46 extending through the center of the roll body 43 to protrude from the two ends of the roll body 43. The shaft 46 protruding from the two ends of the dielectric roll 42 is axially supported by two bearing boxes (only one bearing box is shown) 47 integrated with each other through a bottom plate (not shown). The shaft 46 is rotated by a driving source (not shown). The rotational speed of the shaft 46 is adjusted in synchronism with the traveling speed of the elongated film 36. A ball screw 48 is attached to the lower surface of a middle portion of the bottom plate. The ball screw 48 extends into a recess portion (not shown) of the table 2. Referring to FIG. 4, reference numeral 49 denotes an extended portion of the lower plate 3a of the frame 3. A casing 50 incorporating a threaded engaging plate (not shown) is arranged in the recess portion. The protruding lower end portion of the ball screw 48 is threadably engaged with the engaging plate in the casing 50. A worm shaft (not shown) engaged with the protruding lower end portion of the ball screw 48 is horizontally inserted in the casing 50, and a handle 51 is attached to one end of the worm shaft. With this arrangement, when the handle 51 is rotated, the ball screw 48 engaged with the worm shaft of the handle 51 is rotated to lower (or raise) the bottom plate to which the ball screw 48 is attached. As a result, the dielectric roll 42 axially supported by the box 47 is located to leave a predetermined gap between the box 47 and the elongated film 36 which is conveyed among feed rollers 37.

An elongated electrode 52 is arranged above the dielectric roll 42 to oppose it so as to leave a predetermined distance therebetween along the longitudinal direction of the roll 42. With this arrangement, an arc can be radiated on the elongated film 36, which passes between the roll 42 and the electrode 52, along the direction of the width of the film 36. A lead (not shown) for supplying predetermined power is connected to an end portion of the electrode 52. Upper portions, of the electrode 52, near its both ends are respectively supported by terminals 54 surrounded by insulators 53. Metal rods 55 are respectively attached to the upper ends of the insulators 53 and each rod 55 is supported by a support member 56. Note that a second roll 16 incorporated in the perforating unit 20 includes a roll body having a surface coated with a polymer resin layer, e.g., an urethane resin layer.

An operation of the manufacturing apparatus having the above-described arrangement shown in FIG. 4 will be described below.

A preparation for a perforating operation is performed first to apply a uniform pressure on the elongated film 36, which passes between the first and second rolls 6 and 16, along the direction of width of the film 36 upon pressure control for the unit 20 by the pressure control means 35. Upon completion of the preparation, the handle 51 of the arc radiation means 41 is rotated to locate the dielectric roll 42 at a position where the roll 42 opposes the lower surface of the film 36 to leave a gap of, e.g., about 2 mm therebetween. In addition, the electrode 52 is located to leave almost no gap between the electrode 52 and the upper surface of the elongated film 36. When the first and second rolls 6 and 16 are rotated, a pressure acting on the elongated film 36 made of, e.g., a polyethylene film which passes between the first and second rolls 6 and 16 is reduced because of the effect of the polymer resin layer coated on the surface of the second roll 16. Consequently, the elongated film 36 is perforated by the acute corner portions of large number of synthetic diamonds particles 7 on the surface of the first roll 6 without forming through pores, and a large number of blind pores, each having a size of sub-$\mu$m to several tens $\mu$m, are uniformly formed in the elongated film 36.

The elongated film 36 pre-perforated by the unit 20 is conveyed to the arc radiation means 41 by the plurality of feed rolls 37. Subsequently, the dielectric roll 42 of the arc radiation means 41 is rotated in synchronism with the traveling speed of the film 36, and a high voltage is applied to the electrode 52 through the lead (not shown). As a result, high-voltage discharge is induced between the electrode 52 and the dielectric roll 42 which oppose each other through the elongated film 36. In this case, since the surface of the dielectric roll 42 is covered with nylon bolting cloth 45 having a stitch spacing of, e.g., 5 $\mu$m, as shown in FIG. 5, an arc (electrons) 58 does not concentrate on a portion of the elongated film 36 but is uniformly radiated on blind pores 57 distributed along the direction of width of the film 36, thus forming a large number of through pores 59 on the micron order. In this arc radiation step, the dielectric roll 42 is rotated to prevent the arc 58 from burning the bolting cloth 45 and the like on the surface of the roll 42.

After the perforation process is completed, the elongated film 36 is conveyed to pass through the vessel 39, of the destaticizing means 38, in which the pure water is stored, while an ultrasonic wave generating member (not shown) applies ultrasonic waves on the pure water. With this operation, dust attached to the elongated film 36 is easily washed out. The elongated film 36 having the through pores from which the dust is washed out passes through a plurality of hot air blasting members (not shown) so that water on the surface of the film 36 is evaporated and removed. The elongated film 36 is then taken up by a take-up roll.

According to the manufacturing apparatus of the second embodiment, therefore, pre-perforation is performed to form the large number of blind pores 57 in the elongated film 36 made of, e.g., polyethylene by using the perforating unit 20 and the arc 58 is uniformly radiated on the blind pore 57 in the elongated film 36 by using the arc radiation means 41. With this operation, in comparison with the first embodiment wherein through pores are formed by using only the perforating unit 20, damage to film portions around the through pores can be suppressed, and finer through pores can be formed. Therefore, the tensile strength and the like of the film portions around the through pores are increased, and the essential properties of the film can be maintained. In addition, long porous films in which a large number of through pores, each having a size of sub-$\mu$m to several tens $\mu$m, are uniformly formed at a high density can be continuously manufactured.

Note that since the manufacturing apparatus of the second embodiment employs the arc radiation means, elongated films to be processed are limited to films made of materials other than metals, e.g., polymeric materials, composite materials, and laminated materials.

THIRD EMBODIMENT

Figure 6:
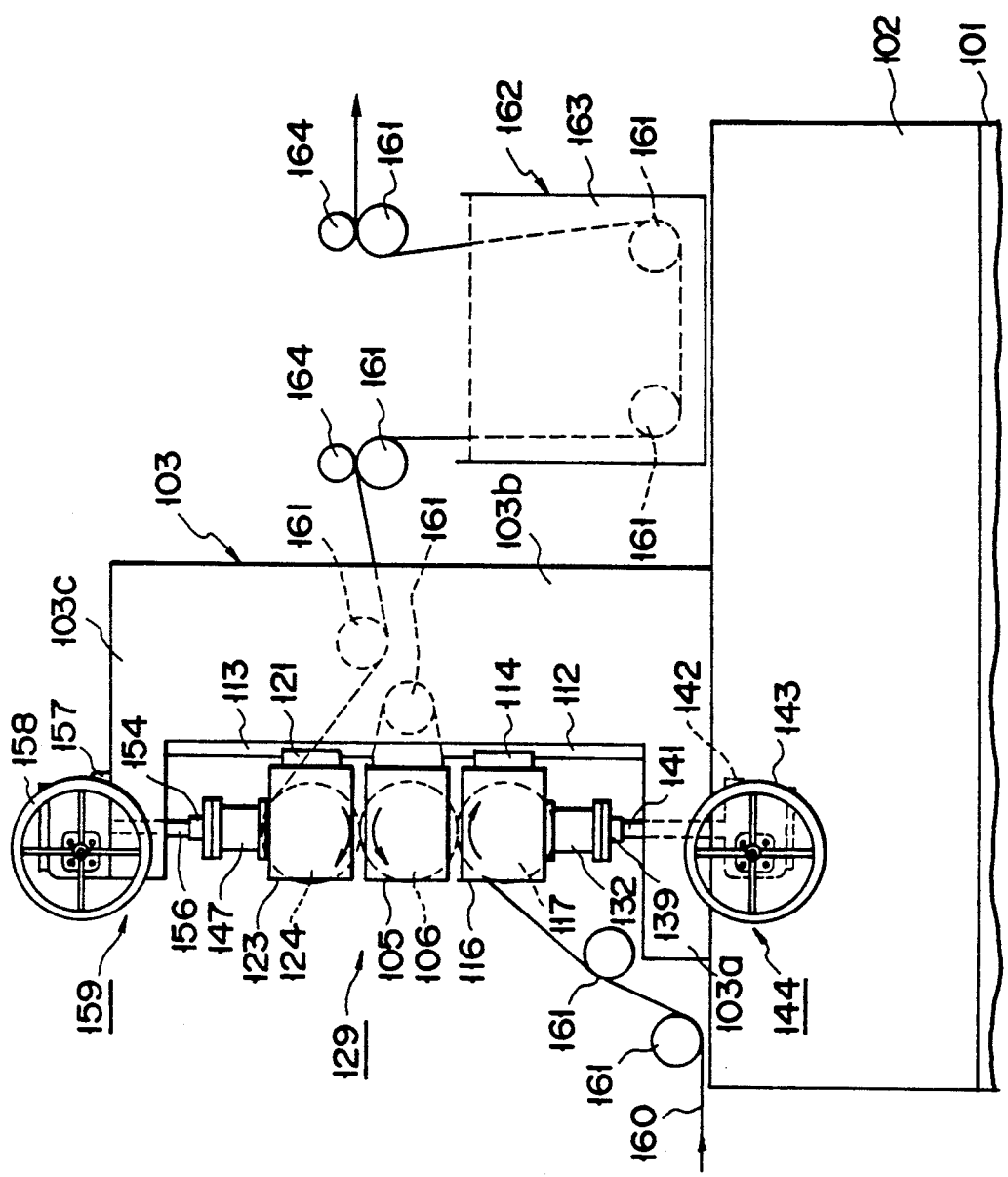
FIG. 6 is a front view showing a porous film manufacturing apparatus according to the third embodiment of the present invention.
Figure 7:
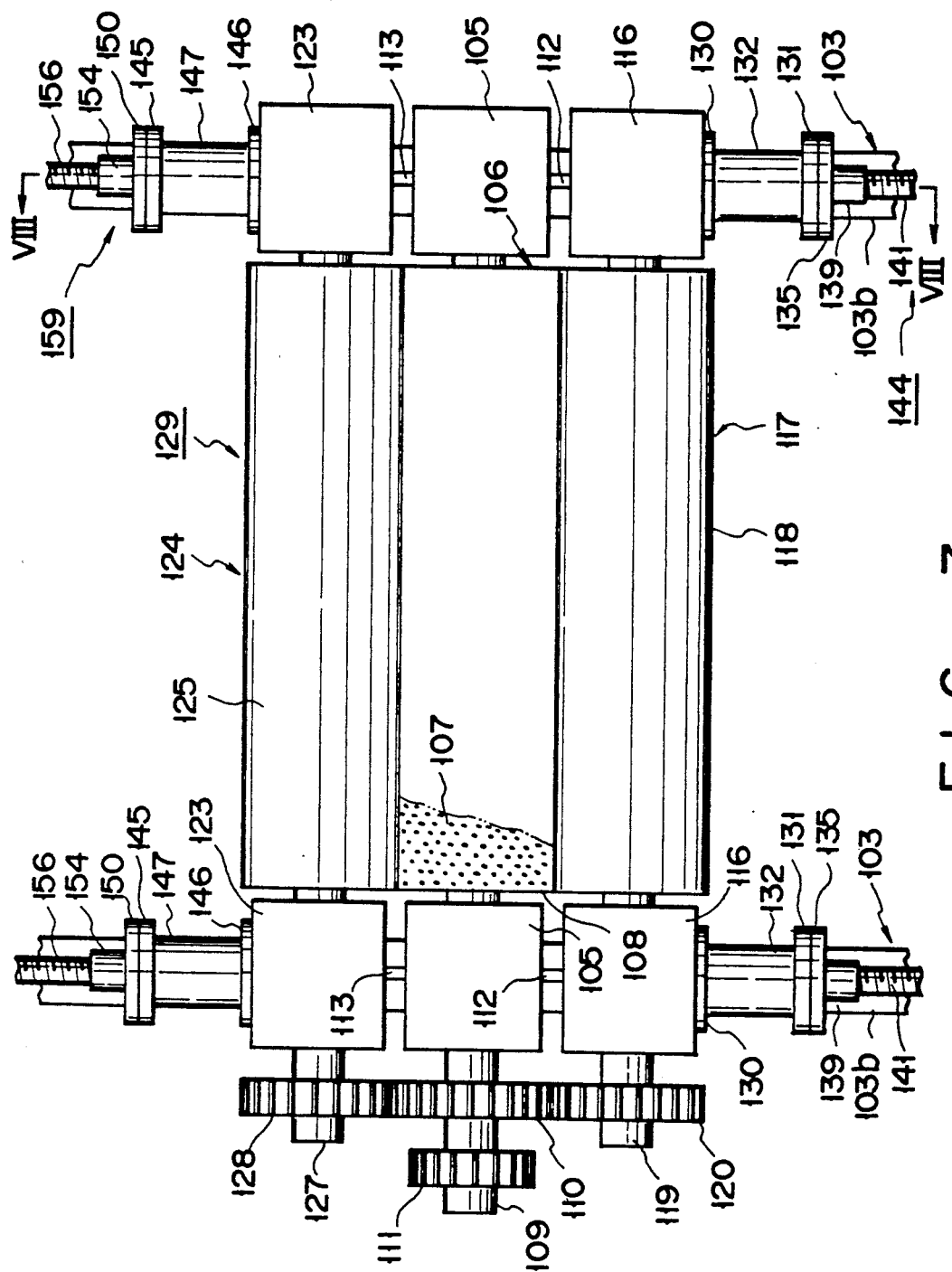
FIG. 7 is a side view showing a main part of the manufacturing apparatus in FIG. 6.
Figure 8:
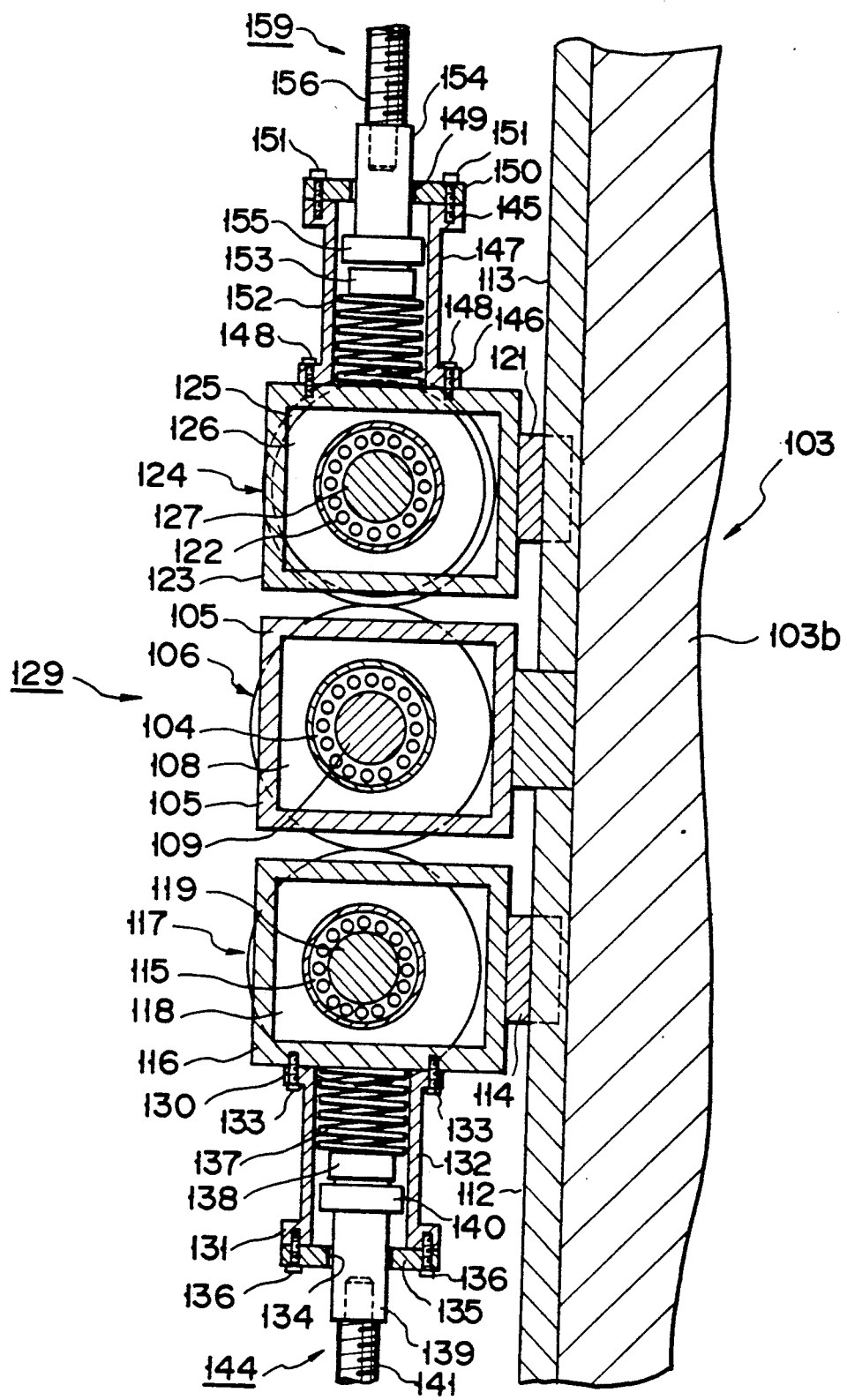
FIG. 8 is a sectional view taken along a line VIII—VIII in FIG. 7.

FIG. 6 is a front view showing a porous film manufacturing apparatus according to the third embodiment of the present invention. FIG. 7 is a side view showing a main part of the manufacturing apparatus in FIG. 6. FIG. 8 is a sectional view taken along a line VIII—VIII in FIG. 7. Referring to FIG. 6, reference numeral 101 denotes a bed. A table 102 is arranged on the upper surface of the bed 101 except for a portion near its right end. Two hook-shaped frames 103 are arranged on the table 102 to be spaced apart by a predetermined distance in the direction of the width of the table 102. Each frame 103 is constituted by a lower plate 103a, a side plate 103b, and an upper plate 103c. A first box 105 incorporating a bearing 104 is fixed to a portion near the middle portion of the side plate 103b of each frame 103. A first roll 106 is arranged between the frames 103. As shown in FIG. 7, the first roll 106 is constituted by an iron roll body 108 and a shaft 109. A large number of particles (e.g., synthetic diamond particles) 107, each having a particle diameter of, e.g., 70 to 85 $\mu$m, acute corner portions, and a Mohs hardness value of 5 or more, are electro-deposited on the surface of the roll body 108 at an area ratio of 70% or more. The shaft 109 extends through the center of the main body 108 to protrude from the two end faces of the roll body 108. The two protruding end portions of the shaft 109 are axially supported by the bearings 104 of the first boxes 105, respectively. A portion, of the shaft 109, located on one end side (e.g., the left end side) of the first roll 106 extends through the box 105, and a gear 111 meshed with a gear of the driving shaft of a motor (not shown) is fitted on the protruding portion of the shaft 109. With this arrangement, when the motor is driven, the first roll 106 is rotated, e.g., clockwise. In addition, a gear 110 is fitted on a protruding portion, of the shaft 109, located between the gear 111 and the left side surface of the box 105.

Rails 112 and 113 are respectively formed on portions, of the side plate 103b of each frame 103, located below and above the first box 105. As shown in FIG. 8, sliders 114 (only one is shown) are respectively arranged on the lower rails 112 to be vertically moved. A second box 116 incorporating a bearing 115 is fixed to each slider 114 to be vertically moved along a corresponding one of the rails 112. A second roll 117 is arranged between the frames 103 to be located below the first roll 106 and to oppose it. The second roll 117 is constituted by a roll body 118 made of, e.g., stainless steel and having a hard surface, and a shaft 119 extending through the center of the roll body 118 to protrude from the two end faces of the roll body 118. The two protruding end portions of the shaft 119 are axially supported by the bearings 115 in the second boxes 116, respectively. A portion, of the shaft 119, located on one end side (e.g., the left end side) of the second roll 117 extends through the second box 116 to protrude therefrom, and the protruding portion of the shaft 119 is fitted in a gear 120 meshed with the gear 110 of the shaft 109 of the first roll 106. With this arrangement, the second roll 117 is freely moved along the rails 112 in the vertical direction through the second boxes 116 and the sliders 114. In addition, when the shaft 109 of the first roll 106 is rotated clockwise by the motor, the shaft 119 having the gear 120 meshed with the gear 110 of the shaft 109 is rotated counterclockwise. As a result, the second roll 117 is rotated counterclockwise.

As shown in FIG. 8, sliders 121 are respectively arranged on the upper rails 113 to be vertically moved. A third box 123 incorporating a bearing 122 is fixed to each slider 121 to be vertically moved along a corresponding one of the rails 113. A third roll 124 is arranged between the frames 103 to be located above the first roll 106 and to oppose it. The third roll 124 is constituted by an iron roll body 126 having a surface covered by a polymeric layer 125 made of, e.g., an urethane resin, and a shaft 127 extending through the center of the roll body 12 to protrude from the two end faces of the roll body 126. The two protruding end portions of the shaft 127 are axially supported by the bearings 122 in the third boxes 123, respectively. A portion, of the third roll 124, located on one end side (e.g., the left end side) of the third roll 124 extends through the third box 123 to protrude therefrom, and a gear 128 meshed with the gear 110 of the shaft 109 of the first roll 106 is fitted on the protruding portion of the shaft 127. With this arrangement, the third roll 124 is freely moved along the rails 113 in the vertical direction through the third boxes 123 and the sliders 121. In addition, when the shaft 109 of the first roll 106 is rotated clockwise by the motor, the shaft 127 having the gear 128 meshed with the gear 110 of the shaft 109 is rotated counterclockwise. As a result, the third roll 124 is rotated counterclockwise.

A perforating unit 129 is constituted by the two frames 103, the two first boxes 105, the first roll 106, the two pairs of sliders 114 and 121, the two second boxes 116, the second roll 117, the two third boxes 123, and the third roll 124.

Cylindrical members 132, each having upper and lower flanges 130 and 131, are respectively arranged on the lower walls of the two second boxes 116. As shown in FIG. 8, each cylindrical member 132 is fastened to a corresponding one of the second boxes 116 with a plurality of screws 133 threadably engaged with the lower wall of the second box 116 through the upper flange 130. A disk 135 having a hole 134 in its center is arranged o the lower flange 131 of each cylindrical member 132. Each disk 135 is fastened to a corresponding one of the lower flanges 131 with a plurality of screws 136 threadably engaged therewith through the disk 135. A coil spring 137 is housed in each cylindrical member 132 to vertically generate an elastic force. Rods 139, each having a pressure sensor 138 attached to its upper end, are respectively inserted into the cylindrical members 132 through the holes 134 of the disk 135. The sensors 138 are respectively brought into contact with the lower ends of the coils springs 137 to detect pressures acting on the coil springs 137 upon upward movement of the rods 139. A disk-like guide 140 is attached to a portion, of each rod 139, located below a corresponding one of the sensors 138 to allow smooth vertical movement of each rod 139. A ball screw 141 is fitted in the lower end portion of each rod 139. Each ball screw 141 extends through the lower plate 103a of a corresponding one of the frames 103 to protrude into a recess portion (not shown) of the table 102. Casings (only one casing is shown) 142, each incorporating a threaded engaging plate (not shown), are respectively arranged in the recess portions. The protruding lower end portions of the ball screws 141 are threadably engaged with the engaging plates in the casings 142, respectively. Worm shafts (not shown) engaged with the protruding lower end portions of the ball screws 141 are horizontally inserted into the casings 142, respectively. In addition, a handle (the other handle is not shown) 143 is attached to one end of each worm shaft. With this arrangement, when the handles 143 are rotated, the ball screws 141 engaged with the worm shafts of the handles 143 are rotated to raise (or lower) the rods 139 in which the ball screws 141 are respectively fitted. In this case, when each rod 139 is lowered by a predetermined distance or more, the disk-like guide 140 attached to the rod 139 is brought into contact with the inner surface of the disk 135 on the lower portion of the cylindrical member 132 to lower the cylindrical member 132 itself. Consequently, the second box 116 fixed to the upper end of the cylindrical member 132 is moved downward along the lower rail 112 through the slider 114.

A first pressure control means 144 for controlling a pressure acting on a film passing between the first and second rolls 106 and 117 is constituted by the two cylindrical members 132, the two disks 135, the two coil springs 137, the two pressure sensors 138, the two rods 139, the two disk-like guides 140, the two ball screws 141, the two casings 142, the two worm shafts (not shown), and the two handles 143.

Cylindrical members 147, each having upper and lower flanges 145 and 146, are respectively arranged on the upper walls of the two third boxes 123. As shown in FIG. 8, each cylindrical member 147 is fastened to a corresponding one of the third boxes 123 with a plurality of screws 148 threadably engaged with the upper wall of the third box 123 through the lower flange 146. A disk having a hole 149 in its center is arranged on the upper flange 145 of each cylindrical member 147. Each disk 150 is fastened to a corresponding one of the upper flanges 145 with a plurality of screws 151 threadably engaged with the upper flange 145 through the disk 150. A coil spring 152 is housed in each cylindrical member 147 to vertically provide elastic force. The lower end of each coil spring 152 is brought into contact with the upper wall of a corresponding one of the third boxes 123. Rods 154, each having a pressure sensor 153 attached to its lower end, are respectively inserted into the cylindrical members 147 through the holes 149 of the disks 150. The sensors 153 are respectively brought into contact with the upper ends of the coil springs 152 to detect pressures acting on the coil springs 152 upon downward movement of the rods 154. Disk-like guides 155 are respectively attached to portions, of the rods 154, located above the sensors 153 so as to allow smooth vertical movement of the rods 154. Ball screws 156 are respectively fitted in the upper end portions of the rods 154. Each screw ball 156 extends through the upper plate 103c of a corresponding one of the frames 103 to protrude upward from the upper plate 103c. Casings (only one casing is shown) 157, each incorporating a threaded engaging plate (not shown), are respectively arranged on the upper surfaces of the upper plates 103c. The protruding upper end portion of each ball screw 156 is threadably engaged with the engaging plate in a corresponding one of the casings 157. Worm shafts (not shown) engaged with the protruding upper end portions of the ball screws 156 are horizontally inserted into the casings 157, respectively. A handle (the other handle is not shown) 158 is attached to one end of each worm shaft. With this arrangement, when the handles 158 are rotated, the ball screws 156 respectively engaged with the worm shafts of the handles 158 are rotated to lower (or raise) the rods 154 in which the ball screws 156 are fitted. In this case, each rod 154 is raised by a predetermined distance or more, the disk-like guide 155 attached to the rod 154 is brought into contact with the inner surface of the disk 150 on the upper portion of the cylindrical member 147, thus raising the cylindrical member 147 itself. As a result, the third box 123 fixed to the lower end of the cylindrical member 147 is moved upward along the rail 113 through the slider 121.

A second pressure control means 159 for controlling a pressure acting on a film passing through the first and third rolls 106 and 124 is constituted by the two cylindrical members 147, the two disks 150, the two coils springs 152, the two pressure sensors 153, the two rods 154, the two disk-like guides 155, the two ball screws 156, the two casings 157, the two worm shafts (not shown), and the two handles 158.

An elongated film winding roll (not shown) is arranged in front of the perforating unit 129. An elongated film 160 from the winding roll is fed to positions between the first and second rolls 106 and 117 and between the first and third rolls 106 and 124 of the unit 129 through two feed rolls 161. A destaticizing means 162 is arranged at the outlet of the unit 129. The destaticizing means 162 comprises a vessel, arranged on the table 102, in which pure water is stored, and an ultrasonic wave generating member (not shown) for applying ultrasonic waves to the pure water. Five feed rolls 161 are respectively arranged between the unit 129 and the destaticizing means 162, in the vessel, and at the outlet of the vessel 163 so as to convey the elongated film passing between the first and third roll 106 and 124. Note that abutment rolls 164 are respectively arranged in contact with the two feed roll 161 located at the inlet and outlet of the vessel 163. A plurality of hot air blasting members (not shown) for drying the film 160 passing between the feed an abutment rolls 161 and 164, and a take-up roll (not shown) are sequentially arranged at the outlet of the destaticizing means 162.

Figure 9:
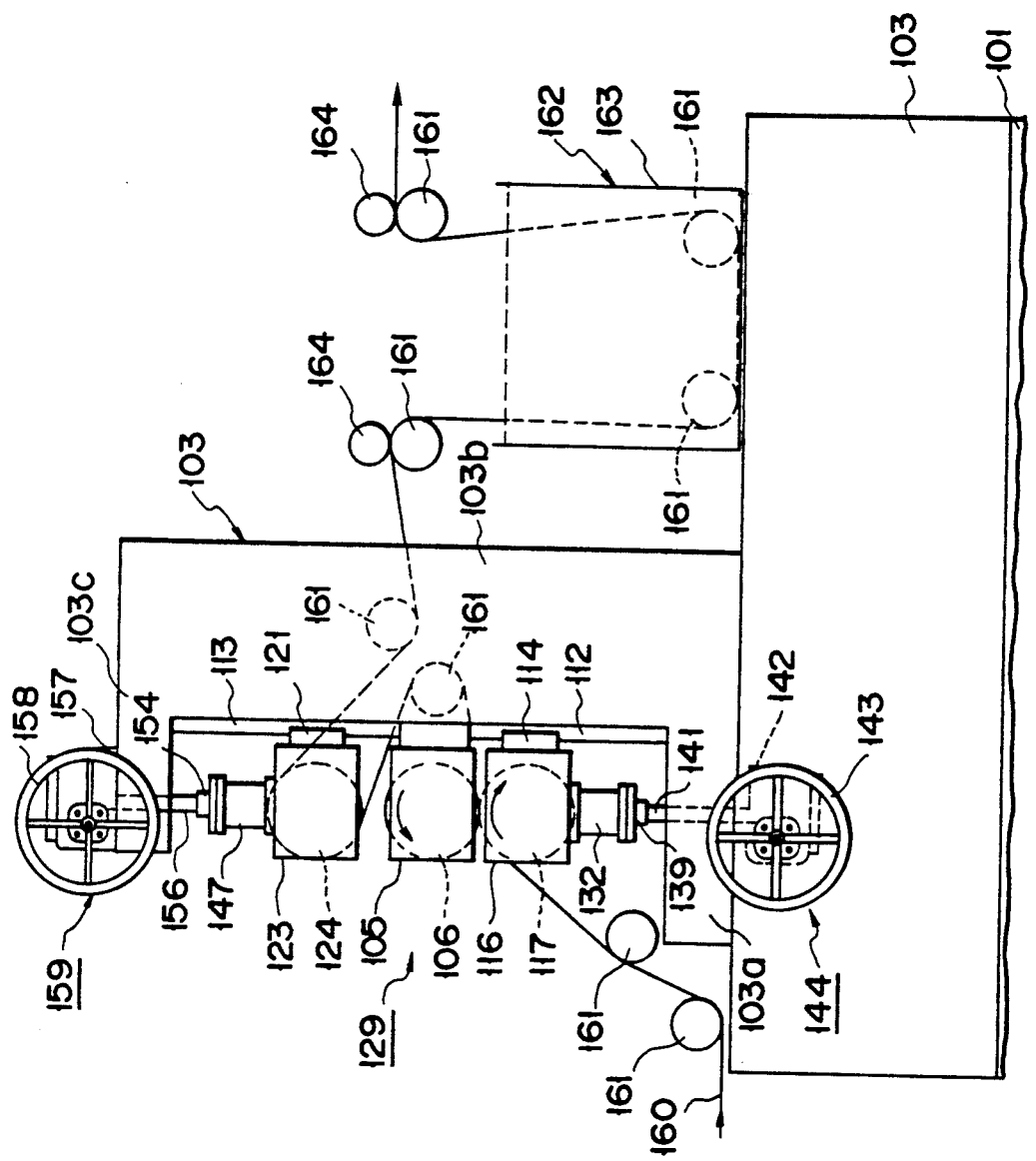
FIG. 9 is a front view for explaining an operation of the porous film manufacturing apparatus of the third embodiment.

An operation (A) to perforate an elongated film between the first and second rolls 106 and 117 of the perforating unit 129 by using the porous film manufacturing apparatus having the above-described arrangement will be described below with reference to FIGS. 7, 8, and 9. An operation (B) to perforate an elongated film between the first and third rolls 106 and 124 of the perforating unit 129 will be described below with reference to FIGS. 7, 8, and 10.

(A) The two handles 143 of the first pressure control means 144 are rotated, e.g., counterclockwise to lower the second boxes 116, of the perforating unit 129, coupled to the upper ends of the cylindrical members 132, along the rails of the frames 103 through the sliders 114, respectively, thereby separating the second roll 117, which is axially supported by the bearings 115 in the second boxes 116, from the first roll 106 by a sufficient distance. In addition, the two handles 158 of the second pressure control means 159 are rotated, e.g., clockwise to raise the third boxes 123, which respectively coupled to the lower ends of the cylindrical members 147, along the rails 113 of the frames 103 through the sliders 121, respectively, thus separating the third roll 124, which is axially supported by the bearings 122 in the third boxes 123, from the first roll 106, located therebelow, by a sufficient distance. In this state, the elongated film 160 made of, e.g., polyethylene is fed from the winding roll (not shown) and is conveyed by the two feed rolls 161 to pass between the first and second rolls 106 and 117.

The film 160 then passes between the first and third rolls 106 and 124 through the feed roll 161. Subsequently, the film 160 is conveyed by the five feed rolls 161 to pass through the vessel 163 of the destaticizing means 162 and is further conveyed to pass through the plurality of hot air blasting members (not shown). Finally, the leading end of the elongated film 160 is wound around the take-up roll (not shown). Note that when the elongated film 160 is caused to pass between the first and third rolls 106 and 124, the film 160 is not brought into contact with the surface of the first roll 106, as shown in FIG. 9.

After the leading end of the elongated film 160 is taken up by the take-up roll, the two handles 143 of the first pressure control means 144 are rotated clockwise to raise the second boxes 116, coupled to the upper ends of the cylindrical member 132, along the rails 112 of the frames 103 through the sliders 114, respectively. As a result, the second roll 117 axially supported by the bearings 115 in the second boxes 116 is brought into contact with the first roll 106 located thereabove. The handles 143 are further rotated in the same direction to cause the sensors 138 on the upper ends of the rods 139 to compress the coil springs 137 located thereabove, respectively. Upon compression of the coil springs 137, pressures are respectively applied to the lower walls of the second boxes 116, thus increasing the pressure between the first roll 106 and the second roll 117 axially supported by the bearings 115 in the second boxes 116. In this case, the pressure (compressing force) between the first and second rolls 106 and 117 is detected by each pressure sensor 138, and the rotation of a corresponding one of the handles 143 is adjusted clockwise/counterclockwise, thereby controlling a pressure acting on the elongated film 160 located between the second and first rolls 117 and 106. When pressure control for the unit 129 is performed by the first pressure control means 144 in this manner, a uniform pressure is applied to the elongated film 160 located between the second and first rolls 117 and 106 along the direction of the width of the film 160. With this operation, the preparation of a perforating operation is completed.

Upon completion of the preparation of the perforating operation, the ultrasonic wave generating member (not shown) applies ultrasonic waves to the pure water stored in the vessel 163 of the destaticizing means 162. The take-up roll is then rotated, and at the same time, the driving shaft of the motor (not shown) is rotated. Upon transmission of the rotating force from the gear of the driving shaft to the gear 111 of the shaft 109, the first roll 106 is rotated clockwise. When the first roll 106 is rotated, the second roll 117 is rotated counterclockwise upon transmission of the rotating force from the gear 110 of the shaft 109 to the gear 120 of the shaft 119 of the second roll 117. In this case, since the third roll 124 is sufficiently separated above from the first roll 106, the gear 128 of the shaft 127 of the third roll 124 is disengaged from the gear 110 of the shaft 109 of the first roll 106. Therefore, the third roll 124 is not driven upon rotation of the motor and hence is set in a free state. When the first and second rolls 106 and 117 are rotated in this manner, the elongated film 160 passing between the rolls 106 and 117 is perforated.

As shown in FIG. 7, the first roll 106 includes the roll body 108 having the surface on which the large number of synthetic diamond particles 107, each having the acute corner portions, are electro-deposited at an area ratio of 70% or more. In addition, the second roll 117 includes the roll body 118 having the hard surface made of, e.g., stainless steel. With these structures, when the elongated film 160 passes between the first and second rolls 106 and 117, the film 160 is perforated by the acute corner portions of the large number of synthetic diamond particles 107 on the surface of the first roll 106, thus uniformly forming a large number of uniform through pores, each having a size of sub-$\mu$m to several tens $\mu$m, in the elongated film 36 in the direction of width thereof. In addition, since pressure control for the unit 129 is performed by the first pressure control means 144, even if the first roll 106 having a surface precision of several tens $\mu$m is incorporated in the perforating unit 129, a uniform pressure can be applied to the elongated film 160, which passes between the first and second rolls 106 and 117, along the direction of width of the film 160. Therefore, dynamic external forces such as vibrations and shocks acting between the first and second rolls 106 and 117 upon passage of the elongated film 160 can be absorbed and reduced, thus allowing smooth, continuous rotation of the first and second rolls 106 and 117. As a result, a large number of uniform through pores, each having the above-mentioned small size, are uniformly formed in the elongated film 160 at a high density.

The elongated film 160 perforated by the unit 129 is conveyed by the five feed rolls 161 and the two abutment rolls 164 to pass through the vessel 163 of the destaticizing means 162. Since a perforating operation of the unit 129 with respect to the elongated film 160 is mainly based on the friction between the first and second rolls 106 and 117, a large amount of static electricity is generated on the surface of the film 160 upon perforation, thus attracting surrounding dust. After the perforating operation, the elongated film 160 is conveyed to pass through the vessel 163, of the destaticizing means 162, in which the pure water is stored, and ultrasonic waves are applied to the pure water by the ultrasonic wave generating member (not shown). With this operation, the dust attracted to the elongated film 160 is easily washed out. The elongated film 160 having the large number of through pores passes through the plurality of hot air blasting members (not shown) so that water on the surface is evaporated and removed. The film 160 is then taken up by the take-up roll.

Figure 10:
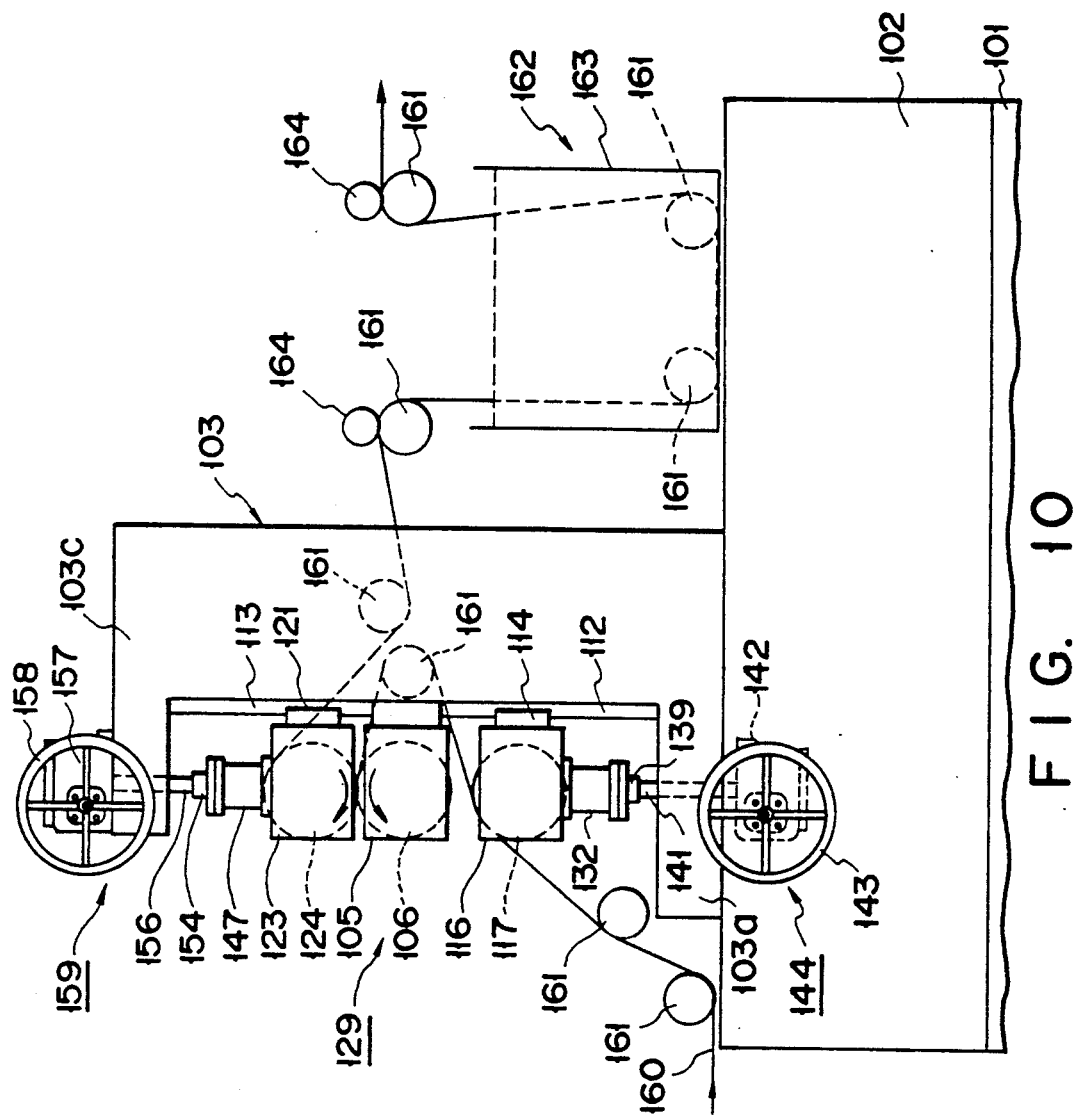
FIG. 10 is a front view for explaining another operation of the porous film manufacturing apparatus of the third embodiment.

(B) Similar to the operation (A) described above, the two handles 143 of the first pressure control means 144 are rotated, e.g., counterclockwise to separate the second roll 117 from the first roll 106, located thereabove, by a sufficient distance. In addition, the two handles 158 of the second pressure control means 159 are rotated, e.g., clockwise to separate the third roll 124 from the first roll 106, located therebelow, by a sufficient distance. Subsequently, the elongated film 160 made of, e.g., polyethylene is fed from the winding roll (not shown) to pass through the respective members, thus winding the leading end of the film around the take-up roll (not shown). Note that when the elongated film 160 passes between the first and second rolls 106 and 117, the elongated film 160 is not brought into contact with the surface of the first roll 106, as shown in FIG. 10.

After the leading end of the elongated film 160 is wound around the take-up roller, the two handles 158 of the second pressure control means 159 are rotated counterclockwise to lower the third boxes 123, coupled to the lower ends of the cylindrical members 147, along the rails 113 of the frames 103 through the sliders 121, respectively. As a result, the third roll 124 axially supported by the bearings in the third boxes 123 is brought into contact with the first roll 106 located therebelow. The handles 158 are further rotated in the same direction to cause the sensors 153 on the lower ends of the rods 154 to compress the coil springs 152 located therebelow. Upon compression of each coil spring 152, a pressure is applied to the upper wall of a corresponding one of the third boxes 124, and a pressure acting between the first roll 106 and the third roll 124 axially supported by the bearings 122 in the third boxes 123 is increased. In this case, the pressure (compressing force) between the third and first rolls 124 and 106 is detected by each pressure sensor 153, and the rotation of a corresponding one of the handles 158 is adjusted clockwise/counterclockwise, thus controlling a pressure acting on the elongated film 160 located between the first and third rolls 106 and 124. When pressure control for the unit 129 is performed by the second pressure control means 159 in this manner, a uniform pressure can be applied to the elongated film 160, located between the first and third rolls 106 and 124, along the direction of the width of the film 160. With this operation, the preparation of a perforating operation is completed.

Upon completion of the perforating operation, the ultrasonic wave generating member (not shown) applies ultrasonic waves to the pure water stored in the vessel 163 of the destaticizing means 162. Subsequently, the take-up roll and the driving shaft of the motor (not shown) are simultaneously rotated. Upon transmission of the rotating force from the gear of the driving shaft to the gear 111 of the shaft 109 of the first roll 106, the first roll 106 is rotated clockwise. When the first roll 106 is rotated, the third roll 124 is rotated counterclockwise upon transmission of the rotating force from the gear 110 of the shaft 109 to the gear 128 of the shaft 127 of the third roll 124. In this case, since the second roll 117 is sufficiently separated upward from the first roll 106, the gear 120 of the shaft 119 of the second roll 117 is disengaged from the gear 110 of the shaft 109 of the first roll 106. Therefore, the second roll 117 is not driven upon rotation of the motor and hence is set in a free state. When the first and third rolls 106 and 124 are rotated in this manner, the elongated film 160 passing between the rolls 106 and 124 is perforated.

As shown in FIG. 7, the first roll 106 includes the iron roll body 108 having the surface on which the large number of synthetic diamond particles 107 having the acute corner portions are electro-deposited at an area ratio of 70% or more. In addition, the third roll 124 includes the roll body 126 having the surface coated with the polymeric resin layer 125 such as an urethane resin layer. With these structures, when the elongated film 160 passes between the first and third rolls 106 and 124, the surface of the first roll 106 is perforated by the acute corner portions of the large number of synthetic diamond particles 107, while the pressure acting on the film 160 upon perforation by the synthetic diamond particles is reduced by the polymer resin layer 125. For this reason, the acute corner portions of the synthetic diamond particles 107 do not penetrate through the film 160 unlike the operation (A) described above, and a large number of uniform blind pores, each having a size of sub-$\mu$m to several tens $\mu$m, are uniformly formed in the elongated film 160 at a high density. In addition, since pressure control for the unit 129 is performed by the second pressure control means 159, even if the first roll 106 having a surface precision of several tens $\mu$m is incorporated in the unit 129, a uniform pressure can be applied to the elongated film 160, which passes between the first and third rolls 106 and 124, along the direction of the width of the film 160. Therefore, dynamic external forces such as vibrations and shocks, acting between the first and third rolls 106 and 124 upon passage of the elongated film 160 are absorbed and reduced, and the first and third rolls 106 and 124 are smoothly and continuously rotated. As a result, a large number of blind pores, each having the small size described above, are uniformly formed in the elongated film 160 at a high density.

The elongated film 160 perforated by the unit 129 is conveyed by the five feed rolls 161 and the two abutment rolls 164 to pass through the vessel 163 of the destaticizing means 162, and dust attached to the elongated film 160 is easily washed out in the same manner as described in the operation (A). The elongated film 160 having the large number of blind pores passes through the plurality of hot air blasting members (not shown) so that water on the surface of the film 160 is evaporated and removed. The elongated film 160 is then taken up by the take-up roll.

According to the porous film manufacturing apparatus of the third embodiment, therefore, a large number of uniform through pores, each having a small size arbitrarily selected in the range of sub-$\mu$m to several tens $\mu$m, can be uniformly formed in the elongated film 160 made of various types of materials, such as polymeric materials and metals, at a high density without almost any deterioration in essential characteristics of the film material, as described in the operation (A). In addition, as described in the operation (B), a large number of uniform blind pores, each having a small size arbitrarily selected in the range of sub-$\mu$m to several tens $\mu$m, can be uniformly formed in the elongated film 160 made of various types of materials, such as polymeric materials and metals, at a high density without almost any deterioration in essential characteristics of the film material. Therefore, the operability of the manufacturing apparatus of this embodiment in perforation can be greatly improved as compared with the manufacturing apparatus of the first embodiment. Note that pressures acting between the first and second rolls 106 and 117 and between the first and third rolls 106 and 124 of the perforating unit 129 may be respectively controlled by the first and second pressure control means 144 and 159, as shown in FIG. 6, so that a large number of uniform through pores and blind pores can be uniformly formed in the elongated film 160 at a high density by causing the film 160 to pass between the rolls 106 and 117 and between the rolls 106 and 124.

In addition, by causing the elongated film 160 to pass through the destaticizing means 162 upon perforation, a dust-free, easy-to-handle porous film can be taken up by the take-up roll.

FOURTH EMBODIMENT

Figure 11:
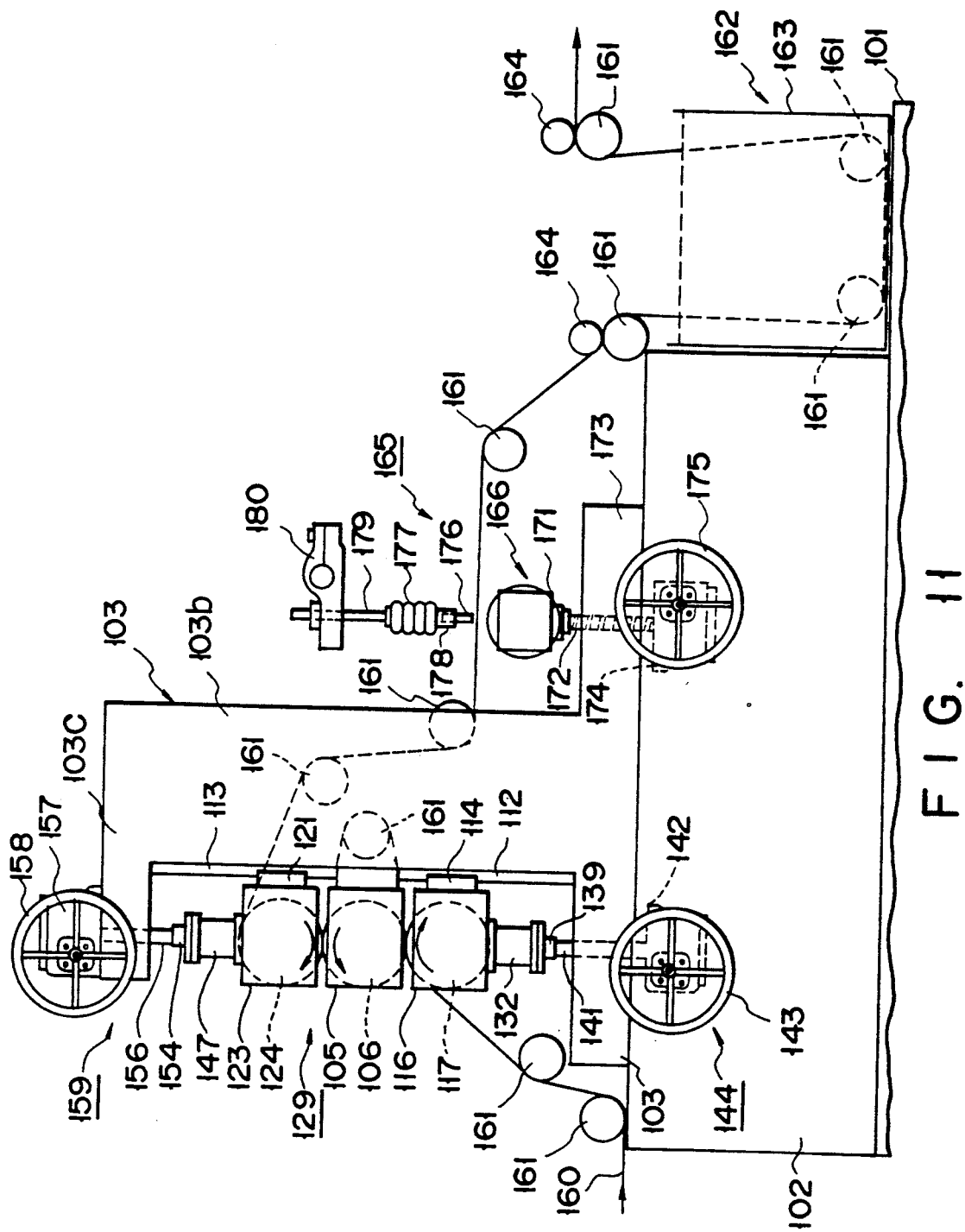
FIG. 11 is a front view showing a porous film manufacturing apparatus according to the fourth embodiment of the present invention.
Figure 12:
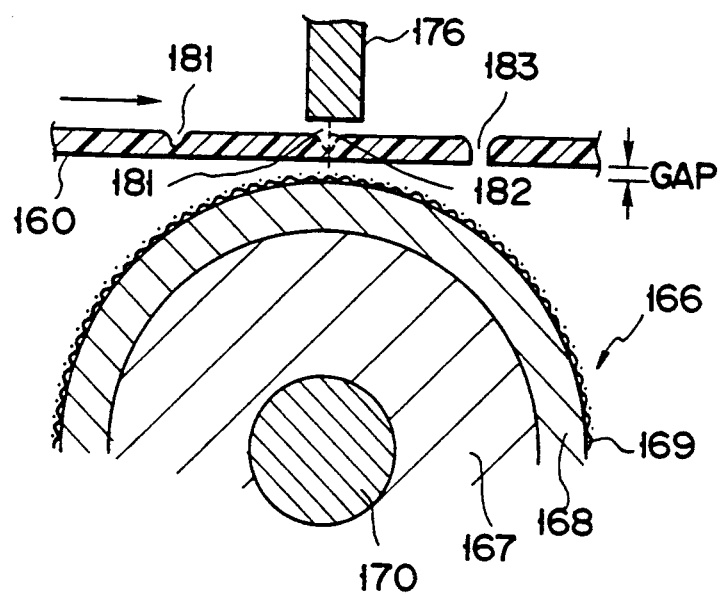
FIG. 12 is a sectional view showing a main part of an arc radiation means incorporated in the apparatus shown in FIG. 11

FIG. 11 is a front view showing a porous film manufacturing apparatus according to the fourth embodiment of the present invention. FIG. 12 is a sectional view showing a main part of an arc radiation means incorporated in the apparatus in FIG. 11. Note that the same reference numerals in FIGS. 11 and 12 denote the same parts as in FIGS. 6 to 8, and a description thereof will be omitted. The manufacturing apparatus shown in FIG. 11 is designed such that an arc radiation means 165 is arranged between the perforating unit 129 and the destaticizing means 162.

The arc radiation means 165 includes a rotatable dielectric roll 166 having a surface on which a large number of fine projections are formed. As shown in FIG. 12, the dielectric roll 166 comprises: an iron roll body 167; a dielectric layer 168 made of, e.g., silicone rubber and coated on the surface of the roll body 167; a nylon bolting cloth 169, having a stitch spacing of, e.g., 5 $\mu$m and coated on the surface of the dielectric layer 168, for forming the large number of fine projections; and a shaft 170 extending through the center of the roll body 167 to protrude from the two ends of the roll body 167. The shaft 170 protruding from the two ends of the dielectric roll 16 is axially supported by two bearing boxes (only one bearing box is shown) 171 integrated with each other through a bottom plate (not shown). The shaft 170 is rotated by a driving source (not shown). The rotational speed of the shaft 170 is adjusted in synchronism with the traveling speed of the elongated film 160. A ball screw 172 is mounted on the lower surface of a middle portion of the bottom plate. The ball screw 172 extends into a recess portion (not shown) of the table 102. Referring to FIG. 11, reference numeral 173 denotes an extended portion of the lower plate 103a of the frame 103. A casing 174 incorporating a threaded engaging plate (not shown) is arranged in the recess portion. The protruding lower end portion of the ball screw 172 is threadably engaged with the engaging plate in the casing 174. A worm shaft (not shown) engaged with the protruding lower end portion of the ball screw 172 is horizontally inserted in the casing 174, and a handle 175 is attached to one end of the worm shaft. With this arrangement, when the handle 175 is rotated, the ball screw 172 engaged with the worm shaft of the handle 175 is rotated to lower (or raise) the bottom plate on which the ball screw 172 is mounted. As a result, the dielectric roll 166 axially supported by the box 171 is located to leave a predetermined gap between the box 171 and the elongated film 160 which is conveyed among feed rollers 161.

An elongated electrode 176 is arranged above the dielectric roll 166 to oppose it so as to leave a predetermined distance therebetween along the longitudinal direction of the roll 166. With this arrangement, an arc can be radiated on the elongated film 160, which passes between the roll 166 and the electrode 176, along the direction of the width of the film 160. A lead (not shown) for supplying predetermined power is connected to an end portion of the electrode 176. Upper portions, of the electrode 176, near its both ends are respectively supported by terminals 178 surrounded by insulators 177. Metal rods 179 are respectively attached to the upper ends of the insulators 177, and each rod 179 is supported by a support member 180.

An operation of the manufacturing apparatus having the arrangement shown in FIG. 11 will be described below.

Similar to the operation (B) described above, the preparation of a perforating operation is completed to apply a uniform pressure to the elongated film 160, which passes between the first and third rolls 106 and 124, along the direction of the width of the film 160 by controlling a pressure acting between the first and third rolls 106 and 124 of the perforating unit 129 by using the second pressure control means 159. Subsequently, the handle 175 of the arc radiation means 165 is rotated to locate the dielectric roll 166 to oppose the elongated film 160 so as to leave a gap of, e.g., 2 mm between the roll 166 and the lower surface of the film 160. At the same time, the electrode 176 is located to leave almost no gap between the electrode 176 and the upper surface of the elongated film 160. When the first and third rolls 106 and 124 are rotated, a pressure acting on the elongated film 160 made of, e.g., polyethylene, which passes between the rolls 106 and 124 is reduced due to the effect of the polymeric resin layer 125 coated on the surface of the third roll 124. As a result, the elongated film 160 is perforated by the acute corner portions of the large number of synthetic diamond particles on the surface of the first roll 106 without being penetrated, and a large number of uniform blind pores, each having a size of sub-$\mu$m to several tens $\mu$m, are uniformly formed in the film 160 at a high density.

The elongated film 160 pre-perforated by the unit 129 is conveyed to the arc radiation means 165 by the plurality of feed rolls 161. Subsequently, the dielectric roll 166 of the arc radiation means 165 is rotated in synchronism with the traveling speed of the film 160, and a high voltage is applied to the electrode 176 through the lead (not shown). As a result, high-voltage discharge is induced between the electrode 176 and the dielectric roll 166 which oppose each other through the elongated film 160. In this case, since the surface of the dielectric roll 166 is covered by the nylon bolting cloth 169 having a stitch spacing of, e.g., 5 $\mu$m, as shown in FIG. 12, an arc (electrons) 182 does not concentrate on a portion of the elongated film 160 but is uniformly radiated in blind pores 181 distributed along the direction of width of the film 160, thus forming a large number of through pores 183, each having the above-mentioned small size. In this arc radiation step, the dielectric roll 166 is rotated to prevent the arc 182 from burning the bolting cloth 169 and the like on the surface of the roll 166.

After the perforation process is completed, the elongated film 160 is conveyed to pas through the vessel 163, of the destaticizing means 162, in which the pure water is stored, while an ultrasonic wave generating member (not shown) applies ultrasonic waves on the pure water. With this operation, dust attached to the elongated film 160 is easily washed out. The elongated film 160 having the through pores passes through a plurality of hot air blasting members (not shown) so that water on the surface of the film 160 is evaporated and removed. The elongated film 160 is then taken up by a take-up roll.

According to the manufacturing apparatus of the fourth embodiment, therefore, pre-perforation is performed to form the large number of blind pores 181 in the elongated film 160 made of, e.g., polyethylene by using the perforating unit 129, and the arc is uniformly radiated on the blind pores 181 in the elongated film 160 by using the arc radiation means 165. With this operation, in comparison with the operation (A) in the third embodiment wherein a large number of through pores are created in the elongated film 160 by causing the film 160 to pass between the first and second rolls 106 and 117 of the perforating unit 129, damage to film portions around the through pores can be suppressed, and finer through pores can be formed. Therefore, the tensile strength and the like of the film portions around the through pores are increased, and the essential characteristics of the film can be maintained. In addition, long porous films in which a large number of through pores, each having a size of sub-$\mu$m to several tens $\mu$m, are uniformly formed at a high density can be continuously manufactured.

Furthermore, if a large number of through pores are to be formed in the elongated film 160 by causing the film 160 to pass between the first and second rolls 106 and 117 of the perforating unit 129 as described in the operation (A) in the third embodiment, all the resultant pores may not be through pores. That is, some blind pores may be left. In such a case, all the pores in the elongated film, some of which are blind pores, can be formed into through pores by causing the film to pass through the arc radiation means.

Note that since the manufacturing apparatus of th fourth embodiment employs the arc radiation means, elongated films to be processed are limited to films made of materials other than metals, e.g., polymeric materials, composite materials, and lamina materials.

FIFTH EMBODIMENT

Figure 13:
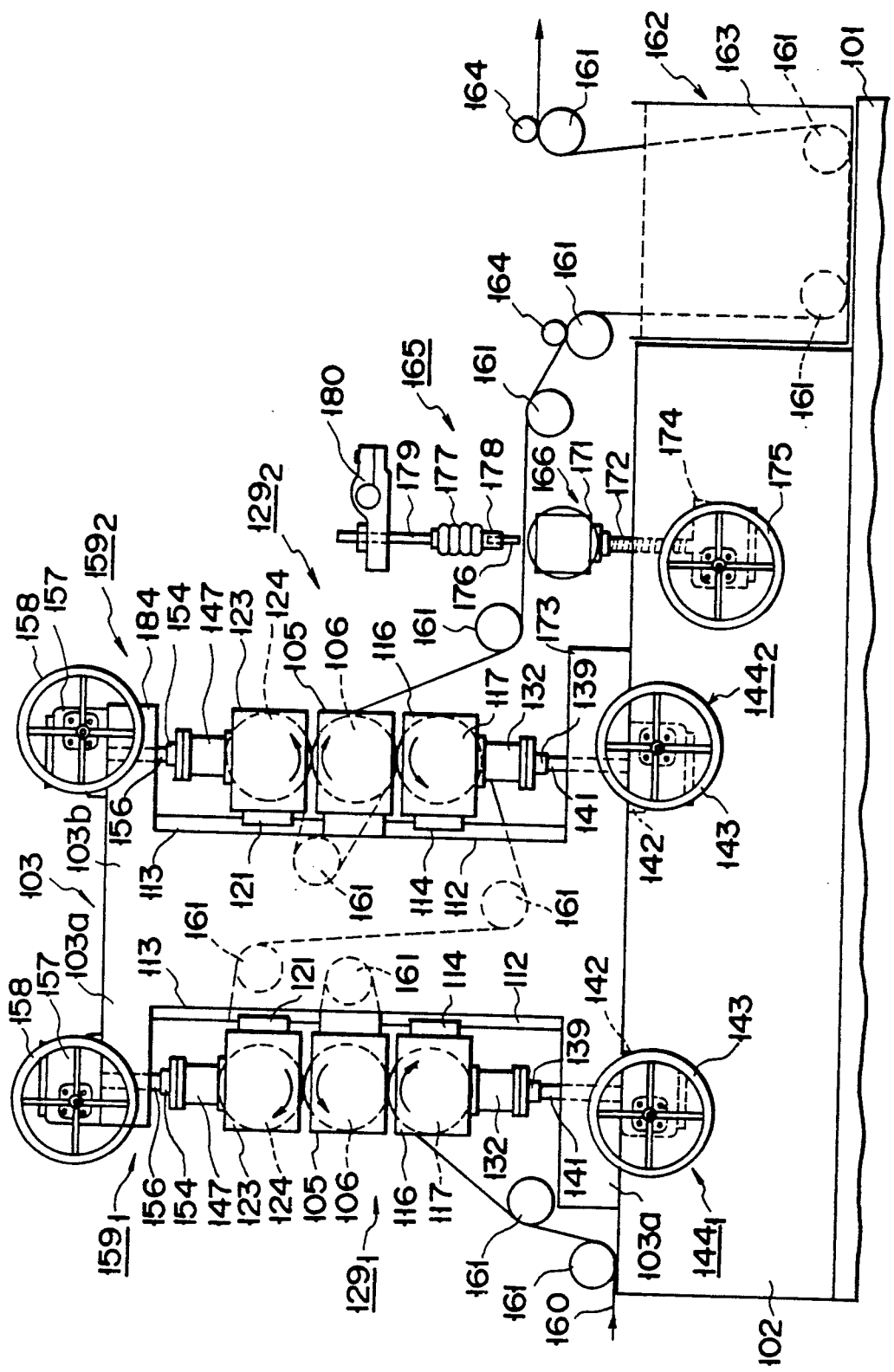
FIG. 13 is a front view showing a porous film manufacturing apparatus according to the fifth embodiment of the present invention.

FIG. 13 is a front view showing a porous film manufacturing apparatus according to the fifth embodiment of the present invention. Note that the same reference numerals in FIG. 13 denote the same parts as in FIGS. 6 to 8 and 11, and a description thereof will be omitted. The manufacturing apparatus shown in FIG. 13 is designed such that two perforating units $129_1$ and $129_2$ are aligned in the conveying direction of an elongated film 160. The perforating unit $129_1$ of the first row is arranged on the left side surface of a side plate 103b of a frame 103 on a table 102, whereas the perforating unit $129_2$ of the second row is arranged on the right side surface of the side plate 103b of the frame 103. The perforating unit $129_1$ of the first row includes a first pressure control means $144_1$ for controlling a pressure acting between first and second rolls 106 and 117 of the unit $129_1$, and a second pressure control means $159_1$ for controlling a pressure acting between the first roll 106 and a third roll 124 of the unit $129_1$. The perforating unit $129_2$ includes a first pressure control means $144_2$ for controlling a pressure acting between first and second rolls 106 and 117 of the unit $129_2$, and a second pressure control means for controlling a pressure acting between the first roll 106 and a third roll 124 of the unit $129_2$. Note that a ball screw 141 of the first pressure control means $144_2$ extends through an extended portion 173 of a lower plate 103a of the frame 103 to be inserted into a recess portion (not shown) in the table 102. A ball screw 156 of the second pressure control means $159_2$ extends through an extended portion 184 of an upper plate 103c of the frame 103 to protrude therefrom. In addition, a casing 157 of the second pressure control means $159_2$ is arranged on the extended portion 184. Two feed rolls 161 are arranged between the perforating units $129_1$ and $129_2$ of the first and second rows. An arc radiation means 165 is arranged at the outlet of the perforating unit $129_2$ of the second row. A destaticizing means 162 is arranged at the outlet of the arc radiation means 165.

An operation of the manufacturing apparatus having the arrangement shown in FIG. 13 will be described below.

In accordance with the operation (B) in the third embodiment described above, a pressure acting between the first and third rolls 106 and 124 of the perforating unit $129_1$ of the first row is controlled by the second pressure control means $159_1$ to apply a uniform pressure to the elongated film 160, located between the first and third rolls 106 and 124, along the direction of width of the film 160. In addition, a pressure acting between the first and third rolls 106 and 124 of the perforating unit $129_2$ of the second row is controlled by the second pressure control means $159_2$ to apply a uniform pressure to the elongated film 160, which passes between the first and third rolls 106 and 124, along the direction of the width of the film 160. In this case, the elongated film 160 passing between the first and third rolls 106 and 124 of the perforating units $129_1$ and $129_2$ of the first and second rows is set such that the upper surface of the film 160 is brought into contact with the first roll 106 (having a surface on which a large number of synthetic diamond particles are electro-deposited) of the perforating unit $129_1$ of the first row, and the lower surface of the film 160 is brought into contact with the first roll 106 of the perforating unit $129_2$ of the second row. Upon completion of the preparation of a perforating operation, a handle 175 of the arc radiation means 165 is rotated to locate the dielectric roll 166 to oppose the elongated film 160 so as to be leave a gap of, e.g., about 2 mm between the roll 166 and the lower surface of the film 160. In addition, the electrode 176 is located to leave almost no gap between the electrode 176 and the upper surface of the elongated film 160.

The first and third rolls 106 and 124 of the perforating units $129_1$ and $129_2$ of the first and second rows are rotated. In the perforating unit $129_1$ of the first row, a pressure acting on the elongated film 160 made of, e.g., polyethylene, which passes between the rolls 106 and 124, is reduced due to the effect of a polymer resin layer 125 coated on the surface of the third roll 124. Therefore, the elongated film 160 is perforated by the acute corner portions of a large number of synthetic diamond particles on the surface of the first roll 106 without being penetrated, and a large number of uniform blind pores, each having a size of sub-$\mu$m to several tens $\mu$m, are uniformly formed in the upper surface of the film 160 at a high density. In the perforating unit $129_2$ of the second row, the elongated film 160 is perforated in the same manner as in the perforating unit $129_1$ of the first row, and a large number of uniform blind pores, each having a size of sub-$\mu$m to several tens $\mu$m, are uniformly formed in the lower surface of the film 160 at a high density.

The elongated film 160 whose upper and lower surfaces are pre-perforated by the perforating units $129_1$ and $129_2$ of the first and second rows is conveyed to the arc radiation means 165 by the feed rolls 161. Subsequently, the dielectric roll 166 of the arc radiation means 165 is rotated in synchronism with the traveling speed of the film 160, and at the same time, a high voltage is applied to the electrode 176 through the lead (not shown). As a result, high-voltage discharge is induced between the electrode 176 and the dielectric roll 166 which oppose each other through the elongated film 160. In this case, since the surface of the dielectric roll 166 is covered with a nylon bolting cloth having a stitch spacing of, e.g., 5 $\mu$m, an arc (electrons) does not concentrate on a portion of the elongated film 160 but is uniformly radiated in blind pore 181 distributed along the direction of width of the film 160, thus forming a large number of through pores on the micron order.

After the perforation process is completed, the elongated film 160 is conveyed to pass through a vessel 163, of the destaticizing means 162, in which pure water is stored, while an ultrasonic wave generating member (not shown) applies ultrasonic waves on the pure water. With this operation, dust attached to the elongated film 160 is easily washed out. The elongated film 160 having the through pores passes through a plurality of hot air blasting members (not shown) so that water on the surface of the film 160 is evaporated and removed. The elongated film 160 is then taken up by a take-up roll.

According to the manufacturing apparatus of the fifth embodiment, therefore, the upper and lower surfaces of the elongated film 160 are pre-perforated by the perforating units $129_1$ and $129_2$ of the first and second rows to form a large number of blind pores in the upper and lower surfaces of the elongated film 160, and an arc is uniformly radiated on blind pores in the elongated film 160 by using the arc radiation means 165. With this operation, damage to film portions around the through pores can be suppressed, and fine through pores can be formed. Therefore, the tensile strength and the like of the film portions around the through pores are increased, and the essential properties of the film can be maintained. In addition, long porous films in which a large number of through pores, each having a size of sub-$\mu$m to several tens $\mu$m, are uniformly formed at a high density can be continuously manufactured.

If the particle size of each of a large number of synthetic diamond particles electro-deposited on the first roll 106 of the perforating units $129_1$ of the first row is set to be different from that on the first roll 106 of the perforating unit $129_2$ of the second row, a large number of through pores having different diameters can be uniformly formed in the elongated film 160 at a high density upon a radiation process by the arc radiation means 165.

In addition, in the manufacturing apparatus having the arrangement shown in FIG. 13, if a large number of blind pores are formed in the upper and lower surfaces of the elongated film 160 by rotating the first and third rolls 106 and 124 of the perforating units $129_1$ and $129_2$ of the first and second rows and causing the elongated film 160 to pass therebetween, and the film 160 is subsequently conveyed to the destaticizing means 162 to perform destaticization without performing a perforation process by the arc radiation means 165, a porous film having a large number of blind pores formed in its upper and lower surfaces can be manufactured. Furthermore, in the manufacturing apparatus shown in FIG. 13, if a large number of through pores are formed in the upper and lower surfaces of the elongated film 160 by rotating the first and second rolls 106 and 117 of the perforating units $129_1$ and $129_2$ of the first and second rows and causing the elongated film 160 to pass therebetween, and the film 160 is subsequently conveyed to the destaticizing means 162 to perform destaticization without performing a perforation process by the arc radiation means 165, a porous film having a large number of through pores formed in its upper and lower surfaces can be manufactured.

In the manufacturing apparatuses of the first to fifth embodiments, each pressure control means is constituted by the cylindrical members, the disks, the coil springs, the pressure sensors, the rods, the disk-like guides, the ball screws, the casing, the worm shafts, and the handles. However, the present invention is not limited to this. For example, the pressure control means may be constituted by an air cylinder. Alternatively, the pressure sensors as components of the pressure control means may be omitted. However, the pressure control means preferably incorporates the sensors in order to perform a perforating operation with higher precision.

Moreover, in the manufacturing apparatuses of the first to fifth embodiments, synthetic diamond particles are used as a large number of particles, each having a Mohs hardness value of 5 or more, which are deposited on the surface of each first roll. Instead of using the synthetic diamond particles, however, another type of particle having a Mohs hardness value of 5 or more, such as carbide alloy particles, e.g., tungsten carbide particles, silicon carbide particles, or boron carbide particles, or sapphire particles, may be used to uniformly form a large number of uniform through pores or blind pores, each having a small size arbitrarily selected in the range of sub-$\mu$m to several tens $\mu$m, in an elongated film at a high density.

As has been described above, according to the present invention, there is provided a porous film manufacturing apparatus which can uniformly form a large number of uniform through pores or blind pores, each having a size arbitrarily selected in the range of sub-$\mu$m to several tens $\mu$m, in an elongated film made of various types of materials, such as polymeric materials and metals, at a high density (e.g., 5,000 to 20,000 per cm$^2$), without almost any deterioration in essential properties of the film materials, thus manufacturing a porous film which can be effectively used as a material such as a sanitary material for a disposable paper diaper as a typical example, a medical material, or a clothing material. In addition, there is provided a provide a porous film manufacturing apparatus which can uniformly and continuously form a large number of uniform through pores or blind pores, each having a small size described above, in an elongated film made of various types of materials at a high density without cutting the film. Furthermore, there is provided a porous film manufacturing apparatus which can uniformly form a large number of uniform through pores in an elongated film made of a polymeric material without making scratches on the film.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A porous film manufacturing apparatus comprising:

feed means for feeding an elongated film;

a perforating unit including a first rotatable roll having a surface on which a large number of particles, each having acute corner portions, are deposited, and a second roll which is rotatable in a direction reverse to a rotating direction of said first roll, said first and second rolls being arranged to oppose each other and to cause the elongated film to pass therebetween, thereby pressing said acute corner portions of said particles into the elongated film; and pressure control means for adjusting a pressure applied to the film, said pressure control means adjusting a depth to which said acute corner portions of said particles are pressed into the elongated film;

wherein said first and second rolls are respectively rotated by shafts extending through the centers of said rolls, and shaft portions located near two ends thereof are axially supported by bearings positioned in boxes, respectively;

wherein at least one of said first and second rolls is movable in a direction to opposite the other roll and said pressure control means comprises springs for applying pressure at opposite axial ends of said movable roll against said boxes of said movable roll, said boxes being arranged near two end portions of said shaft of said movable roll;

wherein said pressure control means further comprises rod pressure members, cylindrical members housing said springs, and abutment means, said abutment means allowing said rod pressure members to move to compress said springs to increase the pressure applied by said movable roll to the film and allowing said rod pressure members to move said movable roll away from the other roll.

2. The apparatus according to claim 1, wherein said particles have a Mohn hardness value of not less than 5.

3. The apparatus according to claim 1, wherein said second roll is comprised of a hard metal.

4. The apparatus according to claim 1, wherein said second roll comprises a coating of a polymeric resin layer on a surface of a metal roll body.

5. The apparatus according to claim 1, further comprising at least one additional perforating unit arranged in a conveying direction of the film.

6. The apparatus according to claim 1, wherein destaticizing means is arranged at an outlet of said perforating unit.

7. The apparatus according to claim 6, wherein said destaticizing means comprises a vessel in which pure water is stored, and an ultrasonic wave generating member for applying ultrasonic waves to the pure water.

8. The apparatus according to claim 1, wherein said particles are natural diamond particles.

9. The apparatus according to claim 1, wherein said particles are synthetic diamond particles.

10. The apparatus according to claim 1, wherein said particles are electro-deposited particles on the surface of said first roll.

11. The apparatus according to claim 1, wherein said pressure control means comprises pressure sensors for detecting the amount of pressure being applied to the film.

12. A porous film manufacturing apparatus comprising:

feed means for feeding an elongated film;

a perforating unit including a first rotatable roll having a surface on which a large number of particles, each having acute corner portions, are deposited, and a second roll which is rotatable in a direction reverse to a rotating direction of said first roll, said first and second rolls being arranged to oppose each other and to cause the elongated film to pass therebetween, thereby pressing said acute corner portions of said particles into the elongated film;

pressure control means for adjusting a pressure applied to the film, said pressure control means adjusting a depth to which said acute corner portions of said particles are pressed into the elongated film; and arc radiation means, arranged at an outlet of said perforation unit, for radiating an arc on the film conveyed from said perforating unit;

wherein said first and second rolls are respectively rotated by shafts extending through the centers of said rolls, and shaft portions located near two ends thereof are axially supported by bearings positioned in boxes, respectively;

wherein at least one of said first and second rolls is movable in a direction to oppose the other roll and said pressure control means comprises springs for applying pressure at opposite axial ends of said movable roll against said boxes of said movable roll, said bosses being arranged near two end portions of said shaft of said movable roll;

wherein said pressure control means further comprises rod pressure members, cylindrical member housing said springs, and abutment means, said abutment means allowing said rod pressure members to move to compress said springs to increase the pressure applied by said movable roll to the film and allowing said rod pressure members to move said movable roll away from the other roll.

13. The apparatus according to claim 12, wherein said particles have a Mohs hardness value of not less than 5.

14. The apparatus according to claim 12, wherein said second roll is comprised of a hard metal.

15. The apparatus according to claim 12, wherein said second roll comprises a coating of a polymeric resin layer on a surface of a metal roll body.

16. The apparatus according to claim 12, further comprising at least one additional perforating unit arranged in a conveying direction of the film.

17. The apparatus according to claim 12, wherein said arc radiation means comprises a rotatable dielectric roll arranged to be separated from the film conveyed from said unit and having a surface on which a large number of fine projections are formed, and an electrode, arranged to oppose said dielectric roll, for inducing high-voltage discharge between said electrode and said dielectric roll to radiate an arc in the direction of width of the film.

18. The apparatus according to claim 17, wherein the large number of projections on the surface of said dielectric roll are projections formed by coating the surface with a dielectric cloth having a stitch spacing on the micron order.

19. The apparatus according to claim 12, wherein destaticizing means is arranged at an outlet of said arc radiation means.

20. The apparatus according to claim 19, wherein said destaticizing means comprises a vessel in which pure water is stored, and an ultrasonic wave generating member for applying ultrasonic waves to the pure water.

21. The apparatus according to claim 12, wherein said particles are natural diamond particles.

22. The apparatus according to claim 12, wherein said particles are synthetic diamond particles.

23. The apparatus according to claim 12, wherein said particles are electro-deposited particles on the surface of said first roll.

24. The apparatus according to claim 12, wherein said pressure control means comprises pressure sensors for detecting the amount of pressure being applied to the film.

25. A porous film manufacturing apparatus comprising:

feed means for feeding an elongated film;

a perforating unit including a first rotatable roll having a surface on which a large number of particles, each having acute corner portions, are deposited, a second roll which has a surface made of a hard material and is rotatable in a direction reverse to a rotating direction of said first roll, and a third roll which has a surface made of a soft material and is rotatable in a direction reverse to the rotating direction of said first roll, said first to third rolls being arranged to oppose each other with said first roll being a middle roll of said first to third rolls and to cause the elongated film to pass between said first and second rolls and between said first and third rolls, said first roll being stationary, and said second and third rolls being movable in a direction to oppose said first roll, thereby pressing said acute corner portions of said particles into the elongated film;

first pressure control means, arranged near two end portions of said second roll of said unit, for adjusting pressures applied from said first and second rolls to the film, said first pressure control means adjusting a depth to which said acute corner portions of said particles are pressed into the elongated film; and second pressure control means, arranged near two end portions of said third roll of said unit, for adjusting pressures applied from said first and third rolls to the film, said second pressure control means also adjusting a depth to which said acute corner portions of said particles are pressed into the elongated film;

wherein said first to third rolls are respectively rotated by shafts extending through the centers of said rolls, and shaft portions located near two ends thereof are axially supported by bearings positioned in boxes, respectively;

wherein said second roll is movable in a direction to oppose said first roll and said first pressure control means comprises springs for applying pressure at opposite axial ends of said second roll against said boxes of said second roll, said boxes being arrange near two end portions of said shaft of said second roll;

wherein said first pressure control means further comprises rod pressure members, cylindrical members housing said springs, and abutment means, said abutment means allowing said rod pressure members to move to compress said springs to increase the pressure applied by said second roll to the film and allowing said rod pressure members to move said second roll away from said first roll;

wherein said third roll is movable in a direction to oppose said first roll and said second pressure control means comprises springs for applying pressure at opposite axial ends of said third roll against said boxes of said third roll, said boxes being arranged near two end portions of said shaft of said third roll;

wherein said second pressure control means further comprises rod pressure members, cylindrical members housing said springs, and abutment means, said abutment means allowing said rod pressure members to move to compress said springs to increase the pressure applied by said third roll to the film and allowing said rod pressure members to move said third roll away from said first roll.

26. The apparatus according to claim 25, wherein said particles have a Mohs hardness value of not less than 5.

27. The apparatus according to claim 25, wherein said second roll is comprised of a hard metal.

28. The apparatus according to claim 25, wherein said third roll comprises a coating of a polymeric resin layer on a surface of an iron roll body.

29. The apparatus according to claim 25, further comprising at least one additional perforating unit arranged in a conveying direction of the film.

30. The apparatus according to claim 25, wherein destaticizing means is arranged at an outlet of said perforating unit.

31. The apparatus according to claim 30, wherein said destaticizing means comprises a vessel in which pure water is stored, and an ultrasonic wave generating member for applying ultrasonic waves to the pure water.

32. The apparatus according to claim 25, wherein said particles are natural diamond particles.

33. The apparatus according to claim 25, wherein said particles are synthetic diamond particles.

34. The apparatus according to claim 25, wherein said particles are electro-deposited particle on the surface of said first roll.

35. The apparatus according to claim 25, wherein said pressure control means comprises pressure sensors for detecting the amount of pressure being applied to the film.

36. A porous film manufacturing apparatus comprising:

feed means for feeding an elongated film;

a perforating unit including a first rotatable roll having a surface on which a large number of particles, each having acute corner portions, are deposited, a second roll which has a surface made of a hard material and is rotatable in a direction reverse to a rotating direction of said first roll, and a third roll which has a surface made of a soft material and is rotatable in a direction reverse to the rotating direction of said first roll, said first to third rolls being arranged to oppose each other with said first roll being a middle roll of said first to third rolls and to cause the elongated film to pass between said first and second rolls and between said first and second rolls, said first roll being stationary, and said second and third rolls being movable in a direction to opposite said first roll, thereby pressing said acute corner portions of said particles into the elongated film;

first pressure control means, arranged near two end portions of said second roll of said unit, for adjusting pressures applied from said first and second rolls to the film, said first pressure control means adjusting a depth to which said acute corner portions of said particles are pressed into the elongated film;

second pressure control means, arranged near two end portions of said third roll of said unit, for adjusting pressures applied from said first and third rolls to the film, said second pressure control means also adjusting a depth to which said acute corner portions of said particles are pressed into the elongated film; and arc radiation means, arranged at an outlet of said perforating unit, for radiating an arc on the film conveyed from said perforating unit;

wherein said first to third rolls are respectively rotated by shafts extending through the centers of said rolls, and shaft portions located near two ends thereof are axially supported by bearings positioned in boxes, respectively;

wherein said second roll is movable in a direction to opposite said first roll and said first pressure control means comprises sprints for applying pressure at opposite axial ends of said second roll against said boxes of said second roll, said boxes being arranged near two end portions of said shaft of said second roll;

wherein said first pressure control means further comprises rod pressure members, cylindrical members housing said springs, and abutment means, said abutment means allowing said rod pressure members to move to compress said springs to increase the pressure applied by said second roll to the film and allowing said rod pressure members to move said second roll away from said first roll;

wherein said third roll is movable in a direction to oppose said first roll and said second pressure control means comprises springs for applying pressure at opposite axial ends of said third roll against said boxes of said third roll, said boxes being arranged near two end portions of said shaft of said third roll;

wherein said second pressure control means further comprises rod pressure members, cylindrical members housing said springs, and abutment means, said abutment means allowing said rod pressure members to move to compress said springs to increase the pressure applied by said third roll to the film and allowing said rod pressure members to move said third roll away from said first roll.

37. The apparatus according to claim 36, wherein said particles have a Mohs hardness value of not less than 5.

38. The apparatus according to claim 36, wherein said second roll is comprised of a hard metal.

39. The apparatus according to claim 36, wherein said third roll comprises a coating of a polymeric resin layer on a surface of an iron roll body.

40. The apparatus according to claim 36, further comprising at least one additional perforating unit, similar to said perforating unit in which said first and second pressure control means are arranged, arranged in a conveying direction of the film.

41. The apparatus according to claim 36, wherein said arc radiation means comprises a rotatable dielectric roll arranged to be separated from the film conveyed from said unit and having a surface on which a large number of fine projections are formed, and an electrode, arranged to opposite said dielectric roll, for inducing high-voltage discharge between said electrode and said dielectric roll to radiate an arc in the direction of width of the film.

42. The apparatus according to claim 41, wherein the large number of projections on the surface of said dielectric roll are projections formed by coating the surface with a dielectric cloth having a stitch spacing on the micron order.

43. The apparatus according to claim 36, wherein destaticizing means is arranged at an outlet of said arc radiation means.

44. The apparatus according to claim 43, wherein said destaticizing means comprises a vessel in which pure water is stored, and an ultrasonic wave generating member for applying ultrasonic waves to the pure water.

45. The apparatus according to claim 36, wherein said particles are natural diamond particles.

46. The apparatus according to claim 36, wherein said particles are synthetic diamond particles.

47. The apparatus according to claim 36, wherein said particles are electro-deposited particles on the surface of said first roll.

48. The apparatus according to claim 36, wherein said pressure control means comprises pressure sensors for detecting the amount of pressure being applied to the film.

* * * * *

UNITED STATES PATENT AND TRADEMARK OFFICE
CERTIFICATE OF CORRECTION

PATENT NO. : 5,257,923                    Page 1 of 2
DATED      : November 2, 1993
INVENTOR(S): Seiji Kagawa It is certified that error appears in the above-indentified patent and that said Letters Patent is hereby corrected as shown below:

| Column | Line | |
|---|---|---|
| 2 | 43 | Change "value" (1st occurrence) to --values--. |
| 8 | 25 | Change "abovedescribed" to --above-described--. |
| 9 | 67 | Change "a" to --as--. |
| 9 | 68 | Change "on" to --one--. |
| 12 | 61 | Change "o" to --on--. |
| 19 | 12 | Before "large" insert --a--. |
| 21 | 14 | Change "roll body 12" to --roll body 126--. |
| 21 | 44 | Change "o" to --on--. |
| 23 | 32 | Change "roll" to --rolls--. |
| 23 | 34 | Change "roll" to --rolls--. |
| 23 | 37 | Change "an" to --and--. |
| 28 | 11 | After "167" insert --.--. |
| 29 | 36 | Change "pas" to --pass--. |
| 30 | 11 | Change "th" to --the--. |
| 30 | 63 | Change "1591" to --$159_1$--. |
| 33 | 66 | Change "opposite" to --oppose--. |
| 34 | 13 | Change "Mohn" to --Mohs-- |
| 35 | 3 | Change "bosses" to --boxes--. |
| 35 | 6 | Change "member" to --members--. |

UNITED STATES PATENT AND TRADEMARK OFFICE
CERTIFICATE OF CORRECTION

PATENT NO. : 5,257,923
DATED : November 2, 1993
INVENTOR(S) : Seiji Kagawa

It is certified that error appears in the above-indentified patent and that said Letters Patent is hereby corrected as shown below:

| Column | Line | |
|--------|------|---|
| 36 | 32 | Change "arrange" to --arranged--. |
| 37 | 14 | Change "particle" to --particles--. |
| 37 | 34 | Change "second" to --third--. |

Signed and Sealed this

Twenty-sixth Day of July, 1994

Attest:

BRUCE LEHMAN

Attesting Officer     Commissioner of Patents and Trademarks